United States Patent [19]
Sato et al.

[11] Patent Number: 6,081,305
[45] Date of Patent: Jun. 27, 2000

[54] LIQUID CRYSTAL LIGHT VALVE AND PROJECTION TYPE LIQUID CRYSTAL DISPLAY USING SUCH VALVE

[75] Inventors: Hideo Sato; Shoichi Hirota, both of Hitachi; Iwao Takemoto; Katsumi Matsumoto, both of Mobara, all of Japan

[73] Assignee: Hitachi, Ltd., Tokyo, Japan

[21] Appl. No.: 08/651,811

[22] Filed: May 21, 1996

[30] Foreign Application Priority Data

May 30, 1995 [JP] Japan .................................... 7-131619
Jul. 10, 1995 [JP] Japan .................................... 7-173541

[51] Int. Cl.[7] .......................... G02F 1/136; G02F 1/1343
[52] U.S. Cl. ............................... 349/5; 349/42; 349/111; 349/143
[58] Field of Search ................................ 349/42, 43, 44, 349/110, 111, 143, 139, 5, 9; 257/59, 72; 345/90, 92, 206

[56] References Cited

U.S. PATENT DOCUMENTS

| | | |
|---|---|---|
| 5,365,355 | 11/1994 | Hastings, III et al. ................. 349/110 |
| 5,461,501 | 10/1995 | Sato et al. ............................... 349/111 |
| 5,541,748 | 7/1996 | Ono et al. ................................ 349/42 |
| 5,574,292 | 11/1996 | Takahashi et al. ...................... 349/42 |

*Primary Examiner*—William L. Sikes
*Assistant Examiner*—Tai V. Duong
*Attorney, Agent, or Firm*—Antonelli, Terry, Stout & Kraus, LLP

[57] ABSTRACT

A liquid crystal light valve for a projection type display such that a pixel circuit area in which a plurality of switching elements are disposed in a matrix state, a drive circuit area in which drive circuit elements are disposed, and the peripheral area are formed on the surface of a semiconductor substrate and further metal layers are provided through insulating layers. The uppermost layer of the metal layers are partitioned by slits to arrange reflectors as output terminals of the switching elements. As middle layers, a shading layer of the pixel circuit area for interrupting an incident light from the slits and a shading layer for interrupting an irradiation to the peripheral area and the drive circuit area are formed. Further, when image data to be displayed in the pixel circuit area has a construction of n×m pixels (where, n and m are even numbers), the number of columns and the number of lines are increased by one, respectively, thereby obtaining a construction of (n+1)×(m+1) pixels.

8 Claims, 21 Drawing Sheets

( ): REFERENCE CHARACTERS IN PARTENTHESIS
ARE FOR VERTICAL SCANNING CIRCUIT DIFFERENT
FROM HORIZONTAL SCANNING CIRCUIT

LIQUID CRYSTAL LIGHT VALVE AND PROJECTION TYPE LIQUID CRYSTAL DISPLAY USING SUCH VALVE

BACKGROUND OF THE INVENTION

The present invention relates to a liquid crystal display for controlling the intensity of light according to the amplitude value of a voltage and, more particularly, to a liquid crystal light valve which is suitable for use in a projection type display.

Liquid crystal displays using an active matrix method, in which switching elements and liquid crystals are laminated for controlling a light, has been disclosed in U.S. Pat. No. 3,862,360 and in the IE80-81 technical report of The Institute of Electronics and Communication Engineers of Japan, 1980. The displays are of a direct viewing type in which an image controlled by the switching elements is directly seen. An MOS (metal oxide-semiconductor) transistor formed on a single crystal silicon substrate is used as a switching element.

When light is irradiated onto the MOS transistor, a photoelectric current is generated in a PN junction section in which a source and a drain are formed. When the photoelectric current is generated in a switching element section for controlling the liquid crystal, a voltage which is applied to the liquid crystal is changed so that the picture quality deteriorates. When the photoelectric current flows into the switching element or a drive circUit section for controlling the switching element, a phenomenon called "latch-up" is caused. A heavy current flows to the power supply, with the result that the circuit operation is disturbed and the chip is destroyed.

FIG. 20 is a schematic diagram of a CMOSLSI for explaining this latch-up phenomenon. A PMOS is formed on a surface of an n-type substrate and an MOS is formed in a p-well region. The substrate supplies a power to VDD (for example +5 V) through an n+ diffusion layer and the p-well supplies a power to VSS (for example, GND) through a p+ diffusion layer. An inverter circuit is constructed in a manner such that the sources of the PMOS and NMOS transistors are connected to VDD and VSS, the gates are combined and connected to an input terminal Vin, and the drains are combined and connected to an output terminal Vout, respectively In the CMOSESI, parasitic bipolar transistors Tr1 and Tr2 and resistors R1 to R4 are used. The transistor Tr1 is an npn transistor in which the source of the NMOS is used as an emitter, the p-well is used as a base, and the substrate is used as a collector. The transistor Tr2 is a pnp transistor in which the source of the PHOS is used as a emitter, the substrate is used as an base, and the p-well is used as a collector. Reference characters R1 and R2 denote resistors formed by the p-well, and R3 and R4 denote resistors formed by the volume resistivity of the substrate.

Each of the parasitic bipolar transistors Tr1 and Tr2 has a thyristor structure as shown in the diagram. When a voltage between the terminals is increased by a trigger current Ip flowing into the parasitic resistor R1 or R4, the parasitic npn or pnp bipolar transistor is turned on. The "on" current flows in the parasitic resistor R1 or R4 and then rapidly increases. A heavy current flows between VDD and VSS, thereby causing a latch-up. Due to the latch-up phenomenon, the voltage in the circuit is decreased, thereby disturbing the circuit operation, and the interconnection layer or silicon substrate is melted, thereby destroying the chip.

The trigger current causing the latch-up occurs due to a light irradiation to the periphery of the MOS transistor in addition to power source noises and the like. Electrons or holes generated in the substrate by the light irradiation move to a PN junction between the substrate of a high electric field and the p-well and form the photoelectric current Ip. The photoelectric current Ip flows between the n+ diffusion region of the substrate and the p+ diffusion region of the p-well to form the trigger current in the thyristor structure.

In the technical report of The Institute of Electronics and Communication Engineers of Japan, (1980), it is described that a source region of an MOS transistor is disposed at a position as far as possible from a light incident region in a switching region of a semiconductor substrate and a stopper diffusion region for recouping carriers generated is provided in order to reduce the photoelectric current which is generated in the MOS transistor to prevent the latch-up.

Although an improvement which becomes less active was a big proposition for a display apparatus using the liquid crystal panel at the beginning, a larger size also has been required in recent years.

The liquid crystal panel consists of liquid crystal elements, each of which is independent for every pixel. The liquid crystal element itself doesn't emit light, but functions as a light valve which modulates the transmission of light and the resulting displays.

Recently, attention has been given to an apparatus in which characteristics as a light valve of the liquid crystal panel are effectively used and the apparatus is built so as to be large using a projection type display method.

The projection type display apparatus can be installed in various ways in accordance with the environment, for example, the apparatus may be installed on the floor, hung from the ceiling, or the like. Further, as projection modes of a screen for display, there are: a projection display from the back side using a projection type screen, and a projection display from the front using a reflection type screen. In order to correspond to the above, a mirror image inversion of an image is consequently necessary.

In such a case, generally, the mirror image inversion is achieved by inverting the horizontal and vertical scanning directions of each liquid crystal panel.

The number of pixels of the liquid crystal panel for the light valve used in the conventional projection type liquid crystal display apparatus usually coincides with the number of pixels necessary for image data to be displayed.

For example, in case of a VGA (Video Graphic Array) specification as a standard for a standard video image signal of a personal computer, the number of pixels of display image data is equal to 307,200 pixels (=640 pixels in the horizontal direction×480 pixels in the vertical direction). In this case, the number of pixels of the liquid crystal panel coincides with the number of pixels of the display data, that is, the number of pixels in a horizontal scanning line is equal to 640 and the number of scanning lines is equal to 480.

FIG. 21 shows a conventional horizontal scanning circuit used for such a liquid crystal panel, comprising a shift register 31 and a clock signal control circuit 39 which operates synchronously with a clock signal CLK.

The shift register 31 consists of a plurality of units 32 and operates in response to clock signals which are inverted and supplied from the clock signal control circuit 39 synchronously with the clock signal CLK to sequentially generate pulses to a plurality of data lines. The pulse drives the pixels of a horizontal scanning line H of the liquid crystal panel, thereby performing a scan.

The scanning direction of the shift register 31 is determined by a scanning direction control signal L/R in this instance. In both of the cases, the scan is started by a start pulse signal STA.

When it is assumed that the number of pixels in a scanning line H is equal to n (for instance, n=640), reference characters can be sequentially designated to the pixels in the scanning line H from the left, PH1, PH2, PH3, . . . , PHn−2, PHn−1, PHn in correspondence to a scan from left to right (L→R). On the other hand, reference characters can be sequentially designated from the right, PH(n), PH(n−1), PH(n−2), . . . , PH(3), PH(2), PM(1) in correspondence to a right to left scan (L←R).

Since the units 32 of the shift register 31 drive the scanning lines on the output side in the scanning direction, the units 32 of the number which is larger than the number of scanning lines by one are necessary for a bidirectional scan.

The number of units 32 of the shift register 31 is equal to n+1 (=641) in correspondence to the number of scanning lines n. As shown in the diagram, reference numerals are sequentially designated as 1, 2, 3, . . . , n−1, n, n+1 in correspondence to the left to right scan (L→R). Similarly, reference numerals are sequentially designated as (n+1), (n), (n−1), . . . , (3), (2), (1) in correspondence to the right to left scan (L←R).

That is, the number of units 32 of the shift register 31 is equal to 641 in correspondence to the 640 scanning lines in this case.

FIG. 22 is a timing chart showing the operation of the horizontal scanning circuit. The upper half shows a case where the scanning direction control signal L/R is set to the high level ("H") and the scanning direction is from left to right, and the lower half shows a case where L/R is set to the low level ("L") and the scanning direction is from right to left.

The shift register 31 sequentially shifts the pulses from a data line PH1 to a data line PHn and from a data line PH(n) to a data line PH(1) at both of the timings of a leading edge and a trailing edge of the clock signal CLK. It is understood that the shifting direction of the shift pulses is set from right to left or from left to right in accordance with the scanning direction control signal L/R.

A noticeable point here is that the positional relationship between the shift pulse and the clock signal is changed to the same data line in accordance with the scanning direction.

When it is assumed that the number of data in the horizontal scanning direction is equal to an even number (640) as in the case of the VGA specification, in case of the scan from left to right, the first scanning line number in the scanning direction is first which is an odd number and the last data line is 640th which is an even number.

On the contrary, in case of the scan from right to left, the first line corresponds to the 640th line in case of the left to right scan, so that it is an even-number line. On the other hand, the last (640th) line corresponds to the first line in the case of the left to the right scan, which is an odd number.

That is, the same data line becomes an odd number or an even number in accordance with the scanning direction in this case.

When it is assumed that the shift register executes a writing operation to a data line at both the leading and trailing edges of a clock signal, namely, the odd number is written to the data line at the trailing edge of the clock signal and the even number is written at the leading edge, the phase of the clock signal necessary to operate the unit in the shift register, which scans the odd-number data line and that of the unit which scans the even-number data line are different, in other words, they are inverted with respect to each other.

When the scanning direction is from left to right, the trailing edge of the clock signal has to appear first after the start pulse signal STA rises. When the scanning direction is from right to left, the leading edge of the clock signal has to appear first after the start pulse signal STA rises.

For this purpose, as shown in FIG. 22, it is consequently necessary to invert the phase of the clock signal HCK in accordance with the upper example of the left to right scanning direction and the lower example of the right to left scanning direction.

That is, if an operation is executed while the phase of the clock signal CLK is kept the same, as in the upper example and in the lower example of FIG. 22, a scan of the data line PH1 is started at a time point $t_0$ when the clock signal CLK is trailed for the first time since a time point $t_H$ when the start pulse signal STA is generated in the upper example. On the contrary, the clock signal CLK rises at a time point $t_1$, not the time point $t_0$ in the lower example. The scanning start time point for the data line Hn consequently becomes $t_1$, so that the operation is delayed by one clock period.

In the conventional example of the horizontal scanning circuit shown in FIG. 21, therefore, there is provided the clock signal control circuit 39 by which the phase of the clock signal CLK inputted from the outside is shifted in accordance with the scanning direction control signal L/R. The signal is supplied to the shift register 31, thereby obtaining the phase inversion of the clock signal CLK in accordance with the scanning direction as shown in FIG. 22.

Although only the horizontal scanning circuit has been described above, the vertical scanning circuit is substantially the same.

A conventional example of the shift register which can execute the above mentioned bidirectional scan and shifts at both timings of the leading and trailing edges of the clock signal is disclosed in, for example, Japanese Patent Application Laid-open HEI 2-137886.

The above-mentioned conventional liquid crystal display using the MOS transistor is of the direct viewing type, and approximately tens of thousands of lux is sufficient for light-fastness necessary for the display panel. In the projection type display, however, since a control image is enlarged and projected onto a screen, the light irradiated to the liquid crystal light valve is millions of lux. The conventional shading structure is consequently insufficient and a structure wherein the semiconductor substrate is completely covered against the incident light is necessary. Further, it is necessary to enhance the light-fastness in not only the switching area for controlling the image, but also for a drive circuit section disposed around the switching area.

In the above-mentioned liquid crystal panel, simplification of the peripheral circuits and the characteristics of change in association with the switching of the scanning directions are not sufficiently considered and there are problems of improvement of performance and cost reduction.

That is, it is necessary to invert the phase of the clock signal in accordance with the scanning direction, so that the clock signal control circuit is required in the conventional technique.

The clock signal control circuit doesn't change the phase of the inputted clock signal and outputs as it is in one scanning direction. The clock signal control circuit is switched to shift the phase of the inputted clock signal by II/2 in the other scanning direction. When a display is considered having a clock signal processing system, a symmetry of signal process paths is lost according to the scanning direction and a symmetry of layout in the peripheral circuits of the liquid crystal panel is also lost, so that the maximum operation speed can be changed according to the scanning direction.

For example, in case of a drive method for performing a writing operation to a data line on both of the leading and trailing edges of a clock signal, since it is necessary to hold a duty ratio of the clock signal to 50%, when the operation characteristics are different according to the scanning directions, a distortion in the clock signal waveform and the like is caused and is a big factor in the performance deterioration.

The frequency of the clock signal ranges from approximately 28 MHz in case of the VGA specification of (640 pixels×480 pixels) to approximately 130 MHz in case of a specification of (1280 pixels×1024 pixels) and a higher precision video signal standard, which is generally used for an engineering work station and the like. The peripheral circuits have to stably operate even at high frequencies, so that the peripheral drive circuits built in the panel are desirably as simple as possible.

As mentioned above, the conventional technique has problems related to performance and costs.

SUMMARY OF THE INVENTION

In consideration of the current conditions, it is an object of the present invention to provide a reliable liquid crystal light valve in which the shading performance against a strong irradiation of light is improved and a latch-up can be prevented.

Another object of the invention is to provide a projection type liquid crystal display for displaying a high-quality image with illumination of around 5 million lux.

Further, another object of the invention is to provide a liquid crystal panel in which there is no fear of performance deterioration in association with an inversion of scanning directions of a horizontal scanning and a vertical scanning, which is applied to a light valve of a projection type liquid crystal display apparatus, and in which costs are sufficiently saved.

According to the present invention, there is provided a liquid crystal light valve comprising: a semiconductor substrate having a pixel circuit area consisting of a plurality of switching elements disposed in a matrix state, a drive circuit area consisting of elements for driving the switching elements, and a peripheral area of the areas on one of the surfaces; a plurality of metal layers which are hierarchically constructed through insulating layers and which have wiring means on the other surface of the semiconductor substrate; a plurality of reflectors formed by dividing the uppermost metal layer by slits and which serve as output terminals of the switching elements; first shading means formed on a metal layer lower than the uppermost metal layer so as to overlap the plane space of the slits of the uppermost section; and second shading means which is at least one of the metal layers formed so as to cover the surface space of the drive circuit area and the peripheral area, wherein a liquid crystal is filled between the semiconductor substrate and a transparent substrate having a common electrode facing the reflectors on the surface opposite to the surface to which the light is irradiated.

At least one of the metal layers has a metal silicide layer such as $WSi_2$ or $MoSi_2$ on the top and/or the under surface of the metal layer.

There is also provided carrier absorbing means which is formed in the peripheral area of the pixel circuit area and the drive circuit area of the semiconductor substrate and which absorbs a carrier which is generated by light irradiation.

There is provided means for keeping another electrode formed in an area corresponding to the peripheral area of the pixel circuit area in the uppermost section and the facing electrode at the same voltage.

The shading means provided in the peripheral area and the reflector have light-fastness such that a light of millions of lux irradiated to the pixel circuit area, the drive circuit area, and the peripheral area and its stray light are almost perfectly reflected or absorbed so as to prevent a latch-up phenomenon occurring in the semiconductor substrate. Thus, there is an effect such that deterioration in the picture quality due to deterioration or breakage of the circuit element can be prevented. The reflection/absorption action is further enhanced by the metal silicide layer.

Since the carrier absorbing means provided in the peripheral area can absorb the carrier which occurs by the light which has reached the semiconductor substrate, photoelectric currents in the drive circuit area and its peripheral area can be remarkably reduced. When the carrier absorbing means and shading means are used together, the lightfastness can be further enhanced.

The other electrode for reflecting the light around the pixel circuit area can be set to the same potential as that of the facing electrode, namely, to zero. The picture screen peripheral area can be consequently made dark, thereby improving the picture quality.

Further, since the shading means can be formed over the plurality of metal layers, the semiconductor substrate can be compactly constructed.

By employing such a liquid crystal light valve, the projection type display for displaying a bright image of high precision and high quality using a light source of up to approximately 5 million lux can be provided.

Further, according to the invention, there is provided a liquid crystal panel which is driven by at least one of a horizontal scanning circuit and a vertical scanning circuit each comprising a shift register for shifting at every one of the leading and trailing edges of a clock pulse signal and which displays an image in which at least one of the number of pixels in the horizontal direction and the number of pixels in the vertical direction is an even number. In the liquid crystal panel, there is provided a liquid crystal display section having at least one of the number of pixels in the horizontal direction and the number of pixels in the vertical direction which is larger than at least one of the number of pixels in the horizontal and vertical directions of image data. The image data is displayed by the liquid crystal display section.

That is, according to the liquid crystal panel of the present invention, the liquid crystal display section has $[(n+1)\times(m+1)]$ pixels having one more lines in each of the vertical and lateral directions than the number of pixels (n×m) (where, n and m are even numbers) of the display data.

By using a liquid crystal display section having one more pixel than the number of pixels of image data, the number of pixels in the liquid crystal display section becomes an odd number. Consequently, the pixel number at the start point of the scan doesn't become an even number, but always is an odd number, even when the scanning direction is changed.

Since it is unnecessary to change the phase of the clock pulse signal which drives the shift register constructing the scanning circuit when the scanning direction is changed, a circuit for inverting the phase of the clock pulse signal can be omitted, so that the scale of the peripheral circuits can be reduced.

Although the number of pixels of the liquid crystal display section increases in this case, since the increased number is very small in comparison to the whole pixel number and the unit portion is increased in the same manufacturing process, the increase in cost is very slight.

On the contrary, when a circuit for inverting the phase of the clock pulse signal is added, the circuit scale in the peripheral circuits is largely increased, so that it is disadvantageous from the view point of cost.

Thus, according to the liquid crystal panel of the invention, costs can be sufficiently saved irrespective of the increase in the pixel number of the liquid crystal display section.

BRIEF DESCRIPTION OF THE DRAWINGS

These and other objects, features and advantages of the present invention will be understood more clearly from the following detailed description with reference to the accompanying drawings, wherein.

DETAILED DESCRIPTION OF THE PREFERRED EMBODIMENTS

Embodiments of the present invention will now be described in detail hereinbelow with reference to the drawings.

Figure 9:
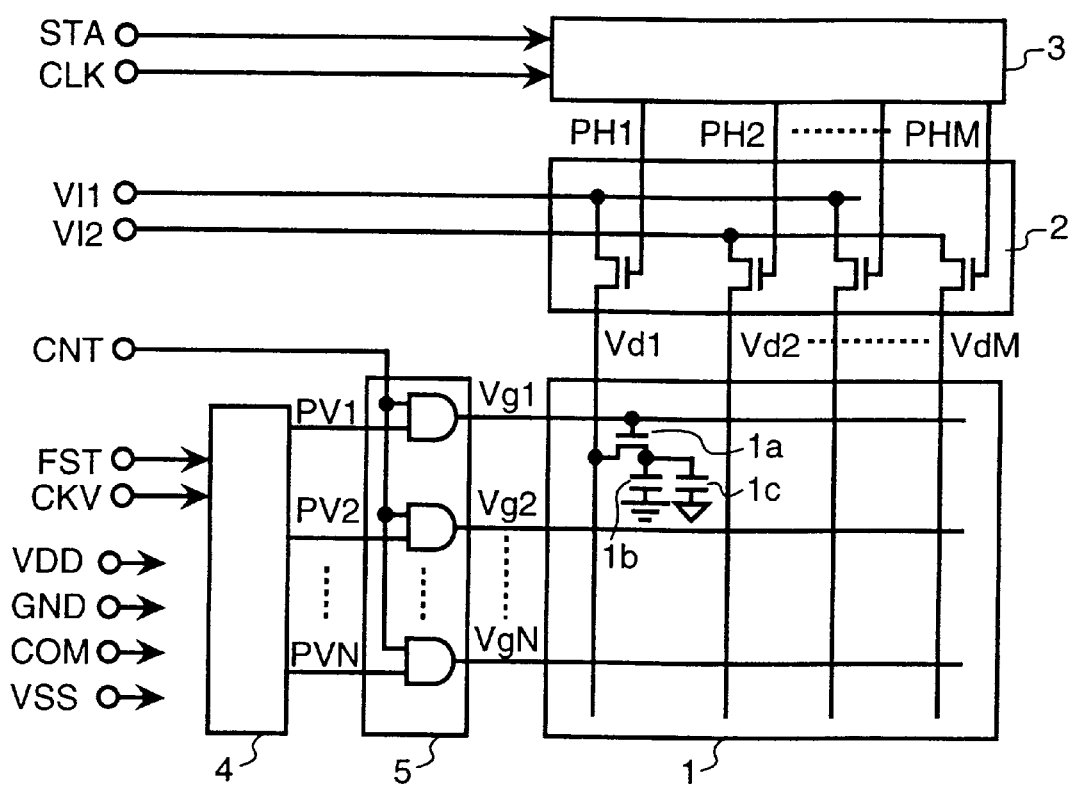
FIG. 9 is a circuit diagram of a liquid crystal light valve.

FIG. 9 shows a general circuit construction of a liquid crystal light valve. The liquid crystal light valve comprises a pixel circuit 1, a sampling circuit 2, a horizontal scanning circuit 3, a vertical scanning circuit 4, and an AND gate unit 5. The circuits are formed on the surface of a semiconductor substrate.

In the pixel circuit 1, M MOS transistors 1a and holding capacitors 1b are arranged in the horizontal direction and N are arranged in the vertical direction. Scan signals Vg1 to VgN from the AND gate unit 5 are connected to gate electrodes of the MOS transistors 1a. Luminance signals Vd1 to VdM from the sampling circuit 2 are connected to drain electrodes. One end of the holding capacitor 1b and a liquid crystal 1c are connected to a source electrode. The other end of the holding capacitor 1b is connected to a voltage VSS for supplying a voltage to the substrate through a shading layer. The liquid crystal 1c is an equivalent capacitor of a liquid crystal element incorporated between the pixel circuit 1 and a facing substrate.

The horizontal scanning circuit 3 is supplied with a clock signal CLK and a start signal STA and outputs multi-phase signals PH1 to PHM of M phases. The sampling circuit 2 comprises an MOS switch and its gate electrodes are connected to the output signals PHI to PHM and its drain electrodes are connected to either one of video signals VI1 and VI2 having different polarities. The luminance signals Vd1 to VdM are outputted from source electrodes of the MOS switch.

The vertical scanning circuit 4 is supplied with a clock signal CKV and a start signal FST and outputs multi-phase signals PV1 to PVN of N phases. The AND gate unit 5 receives the multi-phase signals PV1 to PVN and a control signal CNT and outputs the scan signals Vg1 to VgN.

Figure 10:
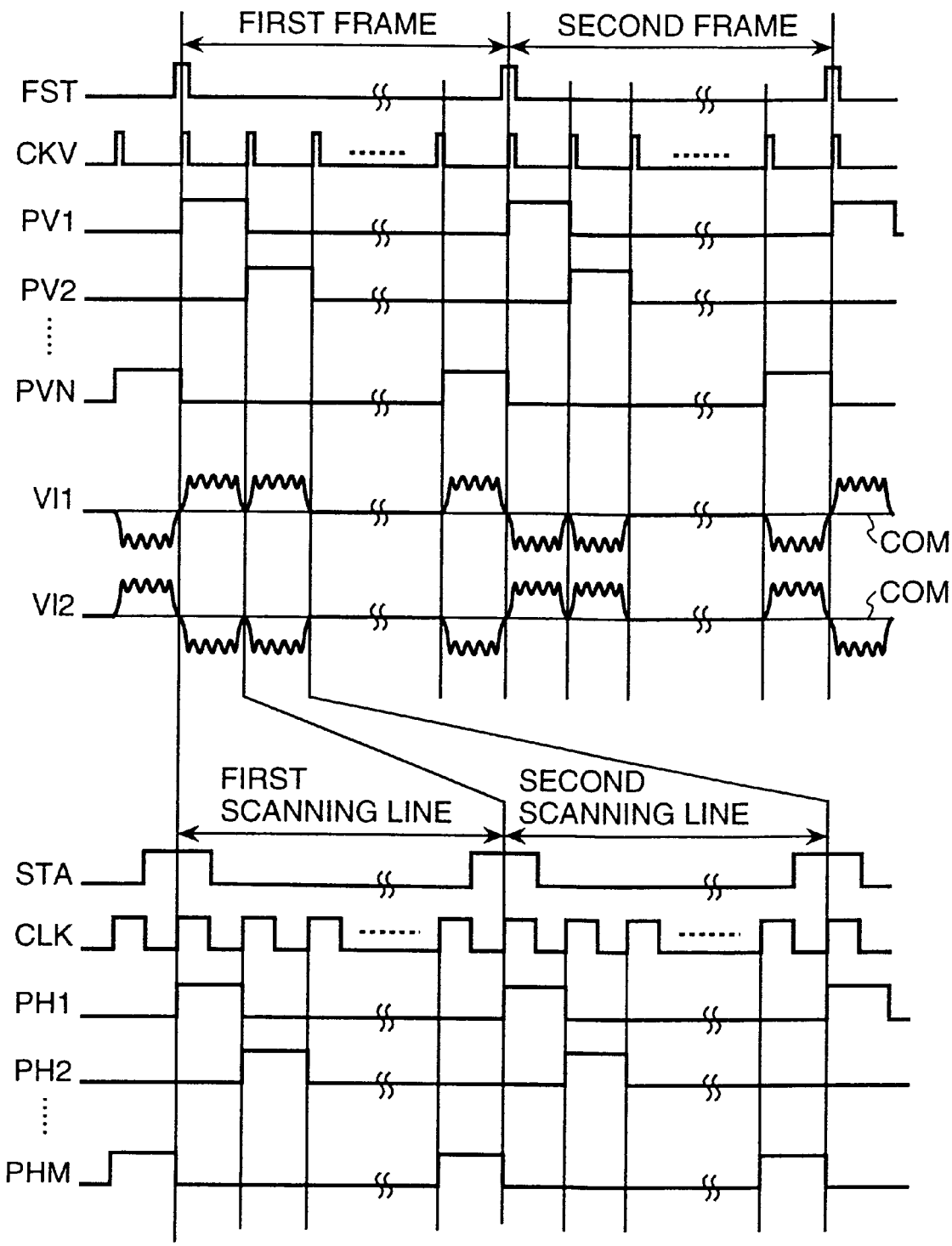
FIG. 10 is a timing chart showing an operation of the liquid crystal light valve.

FIG. 10 is a timing chart for explaining the operation of the liquid crystal light valve. The start signal FST of the vertical scanning circuit 4 shows the head of a frame of a video image to be displayed and the clock signal CKV shows a switching timing of the scanning line. The vertical scanning circuit 4 receives the start signal FST at a timing of a leading edge of the clock signal CKV and generates the multi-phase signals PV1 to PVN. The AND gate unit 5 receives the multi-phase signals PV1 to PVN and the control signal CNT and outputs the scan signals Vg1 to VgN of the pixel circuit 1. In case of a sequential scan of every line, the CNT is set to the high "H" level, thereby sequentially scanning the pixel circuits 1 in the vertical direction arranged in a matrix state by the scan signals Vg1 to VgN at the times of the multi-phase signals PV1 to PVN. The video signals VI1 and VI2 are signals which change by using a voltage COM of the facing electrode as a reference value. The polarities of the signals VI1 and VI2 are opposite each other and are inverted every frame.

In a manner similar to the vertical scanning circuit 4, the horizontal scanning circuit 3 receives the start signal STA indicative of the head of a scanning line at a leading timing of the clock signal CLK and generates the multi-phase signals PHI to PHM. The sampling circuit 2 sequentially samples the video signals VI1 and VI2 at timings of phase signals PHI to PHM and outputs the luminance signals Vd1 to VdM. The luminance signals Vd1 to VdM are supplied to the pixel circuit 1 arranged in a matrix state at every column. Since only the MOS transistors in the pixel circuit 1 in the lines selected by the scan signals Vg1 to VgN are turned on, the luminance signals Vd1 to VdM are written into the holding capacitor 1b in the pixel circuit in the selected lines and held. Since a voltage held in the holding capacitor 1b is applied to the liquid crystal 1c, the liquid crystal light valve can display an image in accordance with the video signals VI1 and VI2.

Figure 11:
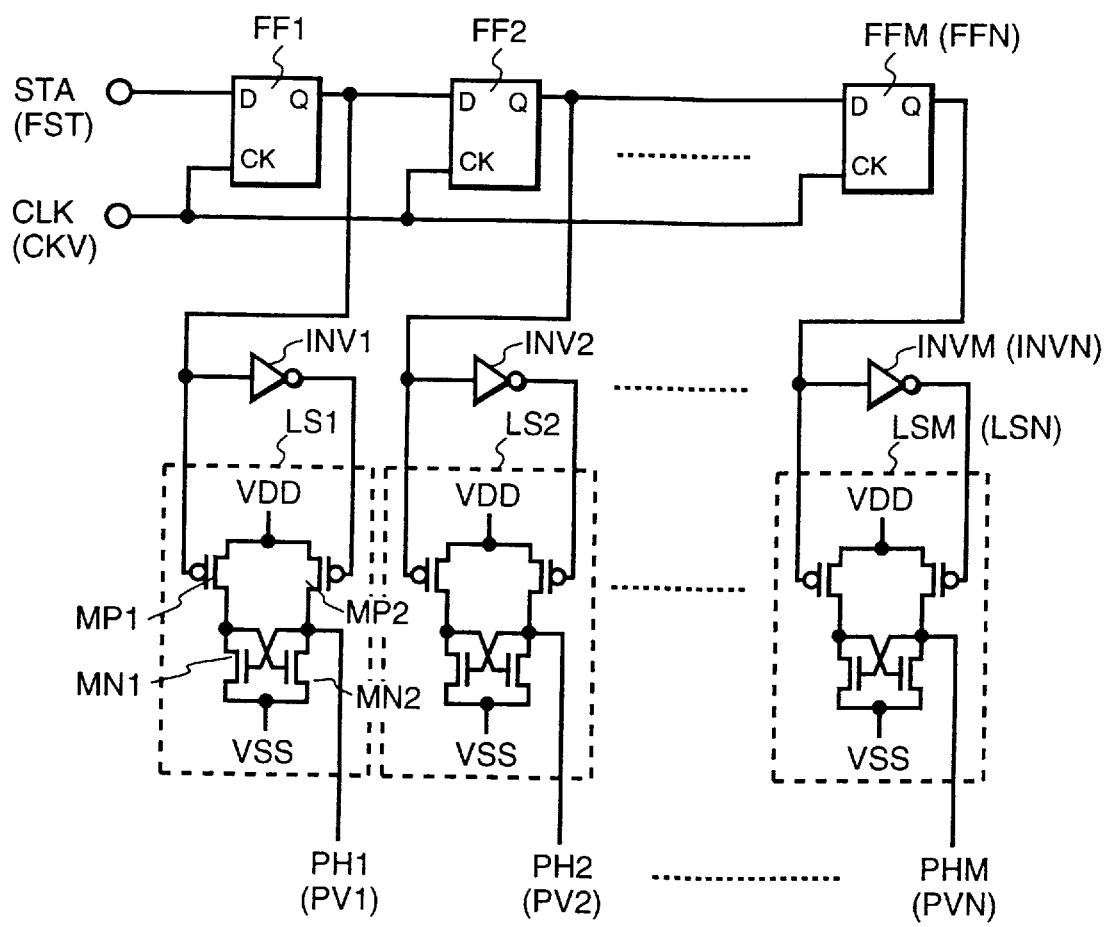
FIG. 11 is a schematic circuit diagram of a scanning circuit of the liquid crystal light valve.

FIG. 11 shows an example of constructions of the horizontal and vertical scanning circuits of the liquid crystal light valve. In the diagram, reference characters without parenthesis show the horizontal scanning circuit and reference characters with parenthesis indicate the vertical scanning circuit. The circuit is constructed by a flip-flop FF of a D type, an inverter INV, and a level conversion circuit LS. By connecting flip-flops FF in series, a shift register having M stages in the horizontal scanning circuits and N stages in the vertical scanning circuits is constructed.

The level conversion circuit LS is constructed by two PMOS transistors MP1 and MP2 each having a source connected to VDD and two NMOS transistors MN1 and MN2 each having a source connected to VSS. An output of the flip-flop FF is connected to a gate of MP1. The phase of the output of the FF is inverted by the inverter INV and is connected to a gate of MP2. The gates of MN1 and MN2 are cross connected to the other's drain and are also connected to the drains of MP2 and MP1, respectively. Further, the connection point of the drains of MN2 and MP2 is set to an output PH (PV) of the scanning circuit.

With such a construction, when the output of the flip-flop FF is "H", MP1 and MN2 are turned off, MP2 is turned on, and the output PH (PV) is VDD. On the other hand, when the output of the flip-flop FF is "L (=GND)", MP1 and MP2 are turned on, MP2 is turned off, and the output PH (PV) is VSS. As mentioned above, the level conversion circuit LS converts a (0–VDD) signal to a (VSS–VDD) signal. The level conversion circuit LS is constructed by a high voltage CMOS transistor which operates with a power source of VDD (+5 V)–VSS (−15 V). Each of FF and INV is constructed by a low voltage CMOS transistor which operates with a power source of VDD (+5 V)–0.

An embodiment of the liquid crystal panel of the invention will now be described hereinbelow.

Figure 12:
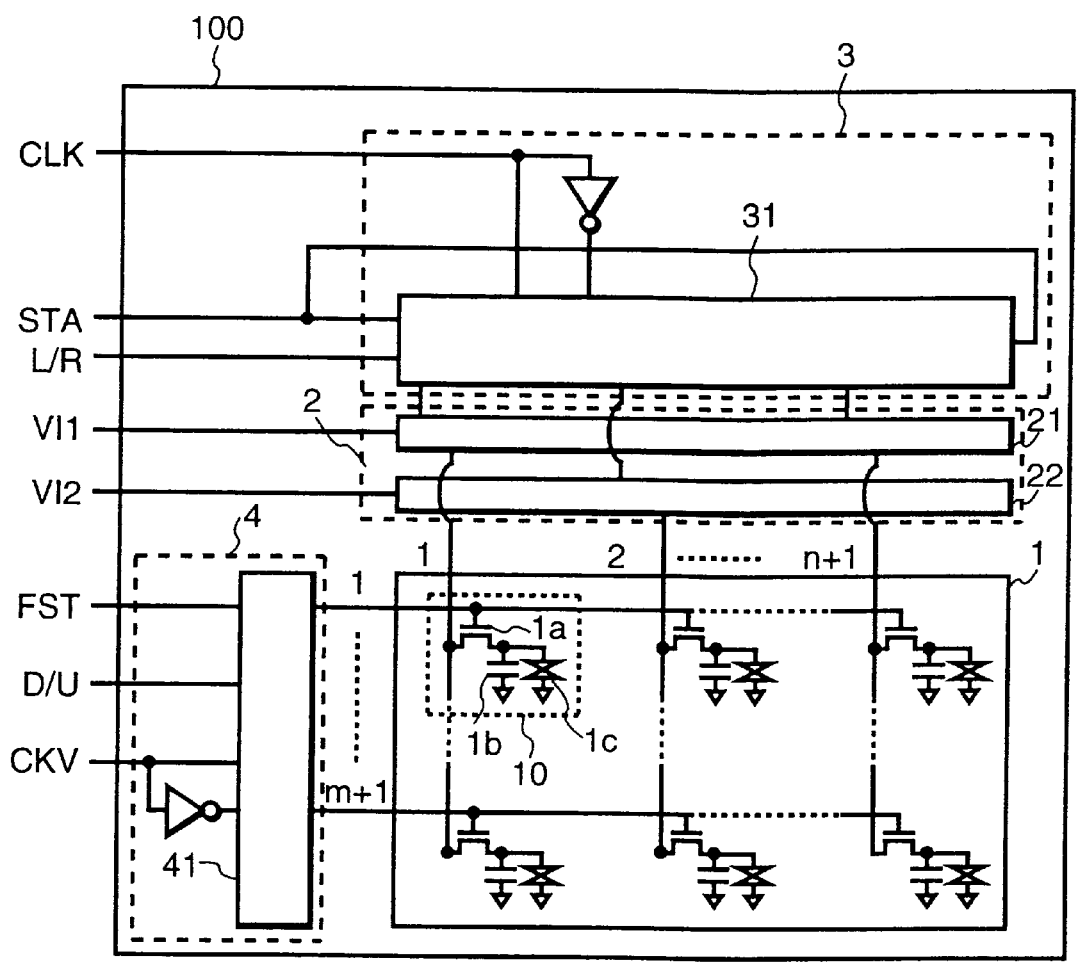
FIG. 12 is a block diagram showing an embodiment of a liquid crystal panel according to the present invention.

FIG. 12 shows an embodiment of the present invention. In the embodiment, the invention is applied to image data in which the number of pixel data in the horizontal direction is equal to n (n=even number) and the number of pixel data in the vertical direction is equal to m (m=even number). In the diagram, reference numeral 100 denotes a liquid crystal panel; 31 denotes the horizontal scanning circuit; 21 denotes a first sampling circuit; 22 denotes a second sampling circuit; 41 denotes a vertical scanning circuit; 10 denotes a unit pixel circuit; and 1 denotes the liquid crystal display section.

When the liquid crystal panel 100 is used as a light valve of a transmission type, a TFT (Thin Film Transistor) chip formed on a glass substrate is used. When it is used as a light valve of a reflection type, an MOS (Metal Oxide Semiconductor) chip formed on a silicon substrate is used. Peripheral drive circuits, namely, the horizontal scanning circuit 31, first sampling circuit 21, second sampling circuit 22, vertical scanning circuit 41 and liquid crystal display section 1, are formed on the liquid crystal panel 100.

(n+1) unit pixel circuits 10 are arranged in the horizontal direction and (m+1) unit pixel circuits 10 are arranged in the vertical direction. The (n+1)×(m+1) unit pixel circuits are arranged in a matrix state as a whole, thereby forming the liquid crystal display section 1. Each unit pixel circuit is constructed by a MOS transistor 1a, a capacitor 1b, and a pixel liquid crystal element 1c.

The liquid crystal display section 1 has a number of lines and a number of columns which are larger than the number of pixels necessary for displaying image data (m lines and n columns) by one line and one column and has an odd-number of lines and an odd-number of columns.

Figure 13:
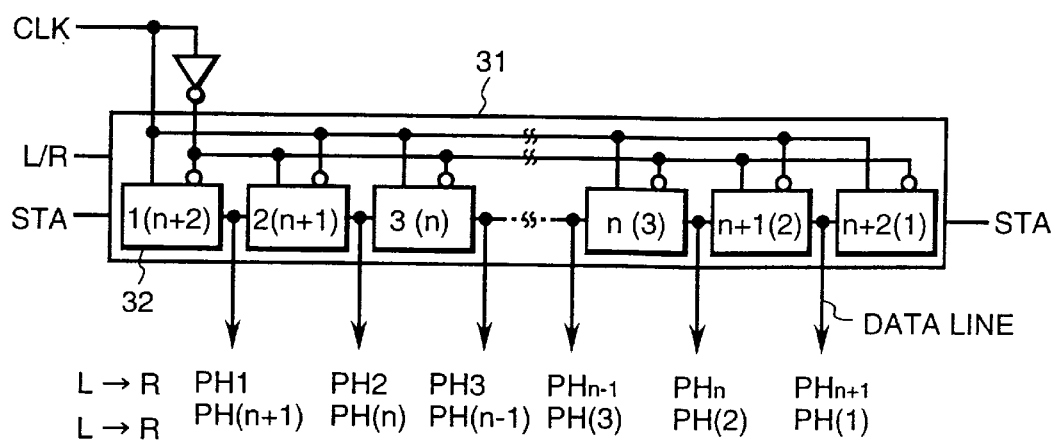
FIG. 13 is a block diagram showing a horizontal scanning circuit in an embodiment of the present invention.

As shown in FIG. 13, the horizontal scanning circuit 31 is constructed by a shift register consisting of (n+2) units 32. The clock signal CLK for horizontal scan, inputted from the outside, and its inversion signal are supplied to each of the units 32 of the shift register forming the horizontal scanning circuit 31. The horizontal scanning circuit 31 operates by switching the scanning directions in response to the horizontal scanning direction control signal L/R.

The start pulse signal STA for horizontal scan specifies a scanning start timing of the horizontal scanning circuit 31. The horizontal scanning circuit 31 starts scanning from left to right or from right to left in accordance with the horizontal direction control signal L/R at a time point when the start pulse signal STA is inputted.

The first sampling circuit 21 and the second sampling circuit 22 supply the first and second video signals VI1 and VI2 subjected to a time division sampling to each of the unit pixel circuits 10. The reason why the first and second video signals VI and VI2 are used will be described hereinlater.

Although it is not shown in detail in the drawings, the vertical scanning circuit 41 is constructed by a shift register having a plurality of units in a manner similar to the horizontal scanning circuit 31. In this case, the number of units is equal to (m+1).

A clock signal VCK for vertical scan, inputted from the outside, and its inversion signal are supplied to the (m+1) units of the shift register constructing the vertical scanning circuit 41. The vertical scanning circuit 41 operates by switching the scanning directions in response to a vertical scanning direction control signal D/U. Further, a scanning start timing is specified by a start pulse signal FST for vertical scan. A scan is started from up to down or from down to up in accordance with the scanning direction control signal U/D at a time point when the start pulse signal FST is inputted.

As mentioned above, the unit pixel circuit 10 is constructed by the MOS transistor 1a, the capacitor 1b, and the pixel liquid crystal element 1c.

The MOS transistor 1a is switched by a gate line as a scanning line of the vertical scanning circuit 41 and transmits the video signal supplied to the drain electrode from the data line as a scan line of the horizontal scanning circuit 31 through the sampling circuits 21 and 22. The capacitor 1b holds the video signal which passes through the MOS transistor 1a and the pixel liquid crystal element 1c operates as a light valve controlling a light transmission amount for every pixel in accordance with the video signal held by the capacitor 1b.

The operation of the embodiment will now be described.

Although the first sampling circuit 21 and the second sampling circuit 22 are used and the first and second video signals VI1 and VI2 subjected to a time division sampling are alternately supplied to the liquid crystal display section 1 in the embodiment as mentioned, since the relation between the data line of the horizontal scanning circuit 31 and the liquid crystal display section 1 is not changed by the above operation, a description will be first given regarding the relation between the data line of the horizontal scanning circuit 31 and the liquid crystal display section 1.

As mentioned above, the horizontal scanning circuit 31 has (n+2) shift register units 32, which is larger than the (n+1) pixels in the horizontal direction of the liquid crystal display section 1 by one.

The units 32 are sequentially designated by reference numerals 1, 2, 3, . . . , n, n+1, n+2 from left to right. On the contrary' reference numerals (1), (2), (3), . . . , (n), (n+1), (n+2) are designated from right to left.

Reference numerals PH1, PH2, PH3, . . . , PHn, PHn+1 are sequentially designated from the left to the data lines in correspondence to the scan from left to right (L→R). Contrarily, reference numerals PH(1), PH(2), PH(3), . . . PH(n), PH(n+1) are designated to the data lines in correspondence to a scan from right to left (L←R).

As will be obviously understood from the drawing, the last data line number is Hn+l in the left to right scan (L→R) and the last data line number is PH(n+1) in the right to left scan (L←R) as well. As mentioned above, since n=even number, it is understood that the number of the last data line is an odd number in the left to right scan (L→R) and also in the right to left scan (L←R).

Although the first data line number in case of a left to right scan (L→R) is H1 and is naturally an odd number, the last data line number is Hn+1 which is an odd number as well. Since the data line becomes the first data line in the right to left scan (L←R), the number PH(1) is naturally an odd number.

Thus, according to the embodiment, the number of the same data line is not switched between even and odd numbers in accordance with the scanning direction and the first data line at the time of the scanning start is always an odd number in either case.

Figure 14:
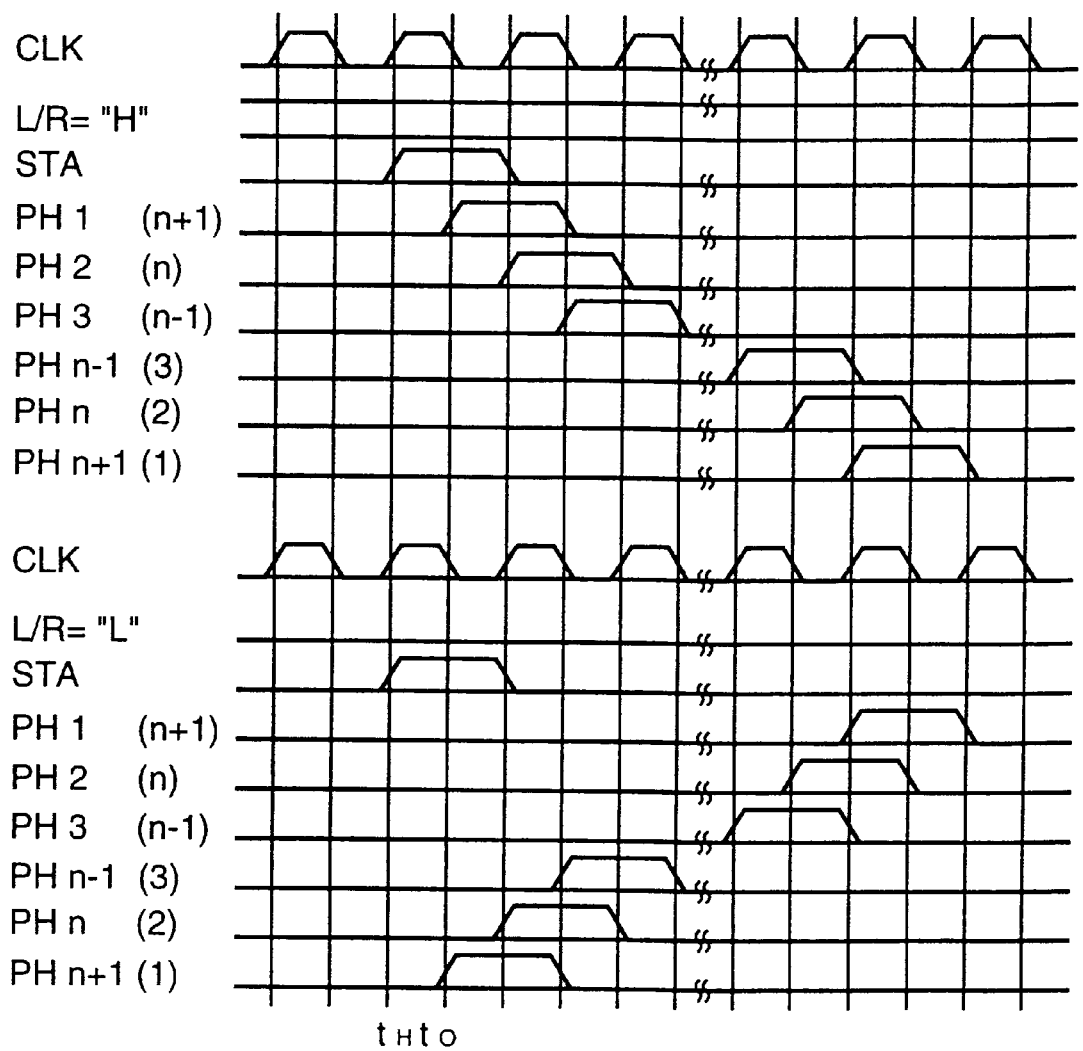
FIG. 14 is a timing chart for explaining the operation of the horizontal scanning circuit in an embodiment of the present invention.

FIG. 14 is a timing chart showing the operation of the embodiment of FIG. 13. In a manner similar to the conventional example of FIG. 22, the upper half shows an example where the scanning direction control signal L/R is set to "H" and the scanning direction is from left to right and the lower half shows an example where L/R="L" and the scanning direction is from right to left.

Figure 22:
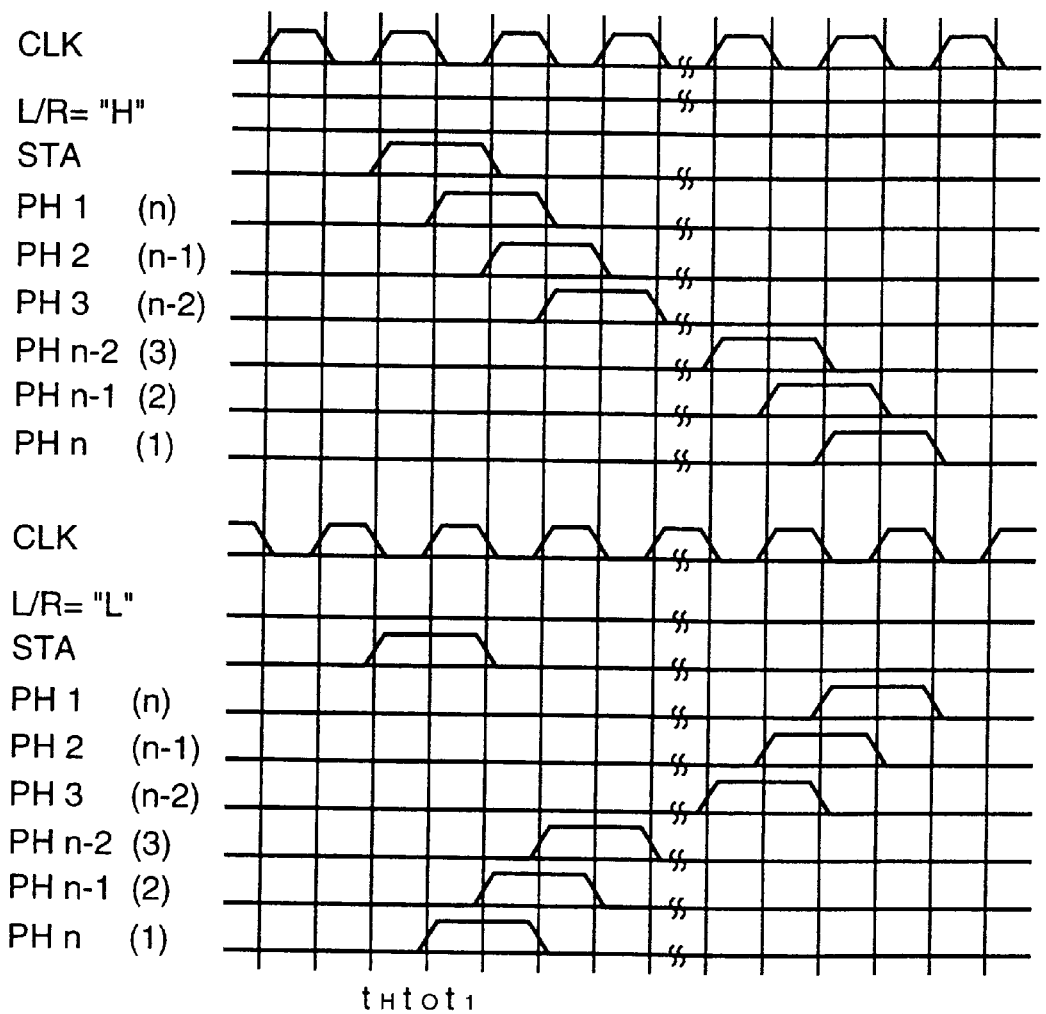
FIG. 22 is a timing chart for explaining the operation of the conventional horizontal scanning circuit.

As opposed to the conventional example of FIG. 22, however, in the embodiment of FIG. 14 of the present invention, the odd-number data line is scanned first since the start pulse signal FST is generated in the upper example where the scanning direction is from left to right and also in the lower example where the scanning direction is from right to left.

Consequently, according to the embodiment shown in FIG. 14, in the upper example where the scanning direction is set from left to right and the lower example where the scanning direction is set from right to left as well, the scan can be started immediately from the first data line at a time point $t_0$ of the trailing edge of the clock signal CLK which appears first after the start pulse signal STA is generated, while the phase of the clock signal CLK is kept the same.

According to this embodiment, since it is unnecessary to invert the phase of the clock signal at the time of the switching of the scanning direction, a clock control circuit becomes unnecessary and the circuit construction around the liquid crystal panel can be simplified.

Since the above description is equally applicable to the vertical scanning circuit 41, a detailed description of the vertical scanning circuit 41 is omitted here.

Referring again to FIG. 12, the reason why the first and second video signals VI1 and VI2 are subjected to time division sampling and the first sampling circuit 21 and the second sampling circuit 22 are provided in accordance with the signals in the embodiment will now be described.

When a D/C voltage is applied for a long period of time, it is feared that the liquid crystal display element deteriorates. In an image display apparatus using the liquid crystal panel, a method of inverting a voltage polarity of a video signal, for example, every frame period, is usually employed.

In this case, however, flickering may occur in a frame period.

As a method usually employed to prevent the flickering, there is a method wherein a video signal is subjected to time-division sampling and is distributed to two video signal lines, in such a way that the polarities of the video signals of the signal lines are inverted and alternatively supplied to the data lines. Since such a method is used in the embodiment of FIG. 12, the first sampling circuit 21 and the second sampling circuit 22 are provided as mentioned above and the first and second video signals VI1 and VI2 are supplied to the circuits.

As an example, the first video signal VI1 is a signal supplied to the odd-number data line and the second video signal VI2 is a signal supplied to the even-number data line in the embodiment of FIG. 12. The signals are supplied to the first sampling circuit 21 and the second sampling circuit 22 and are alternatively selected by the data lines of the horizontal scanning circuit 31 and are applied to the unit pixel circuits 10 in the liquid crystal display section 1.

According to the conventional technique, the video signal inputted to the first column data line is switched between the first video signal VI1 and the second video signal VI2 in accordance with the scanning direction in this case.

Consequently, a control circuit for switching the first video signal VI1 and the second video signal VI2 in accordance with the scanning direction is further needed in the conventional technique.

According to the embodiment of FIG. 12, even when the scanning direction is changed, the data line of the first column does not change between the odd and even numbers, but is always an odd-number. Thus, even when the technique of preventing flickering is employed, a control circuit for switching the video signals is unnecessary, so that the efficiency can be sufficiently improved without increasing the peripheral circuit scale.

Figure 15:
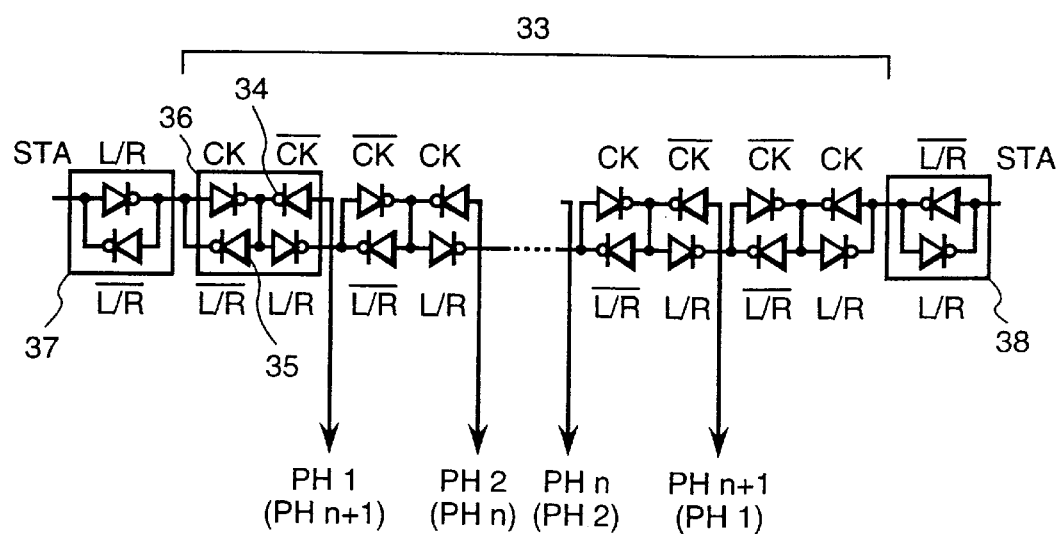
FIG. 15 is a schematic circuit diagram showing a specific example of the horizontal scanning circuit in an embodiment of the present invention.

FIG. 15 shows details of the shift register in the horizontal scanning circuit according to the embodiment of the present invention. In the diagram, reference numeral 33 generally denotes a shift register.

The shift register 33 comprises units 36, each of which is constructed by combining an inverter 34 with two clocks to which a clock signal CK (abbreviation of CLK) and its inversion signal CK⁻ are supplied, and an inverter 35 with two clocks to which a scanning direction control signal R/L and an inversion signal R/L⁻ of the scanning direction control signal R/L are inputted.

As mentioned above, the number of data lines is larger than the number of pixels n in the column direction of the video signal to be displayed by one and is equal to N+1 columns of the liquid crystal display section 1 (FIG. 12). Gates 37 and 38 with clocks for controlling the input direction of the start pulse signal STA are provided on both sides of the shift register 34.

The vertical scanning circuit 41 has substantially the same construction as that mentioned above, except that the scanning direction control signal is D/U and the start pulse signal is a start pulse signal FST for vertical scan.

Figure 1A:
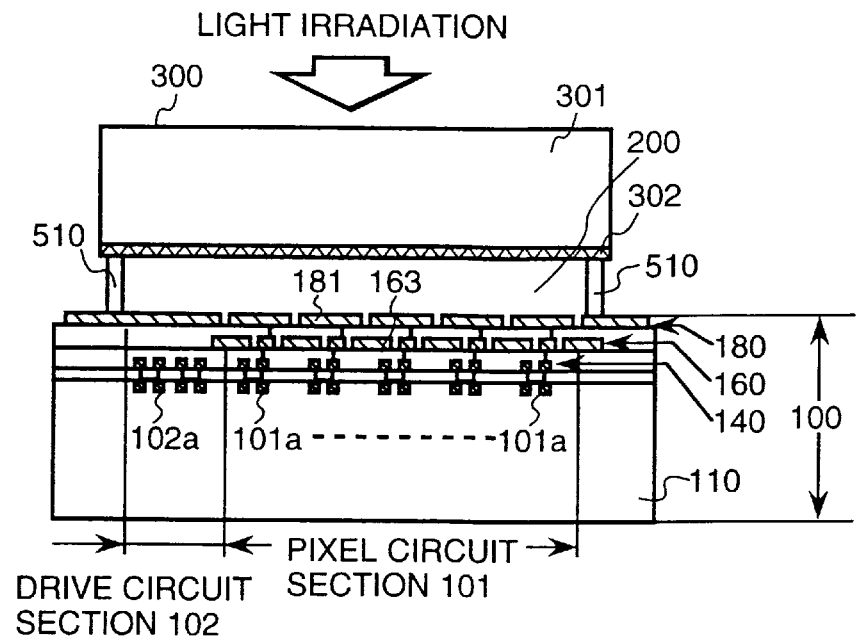
FIG. 1(a) is a sectional view, taken along line A—A in FIG. 1(b), of a liquid crystal light valve according to a first embodiment of the invention.
Figure 1B:
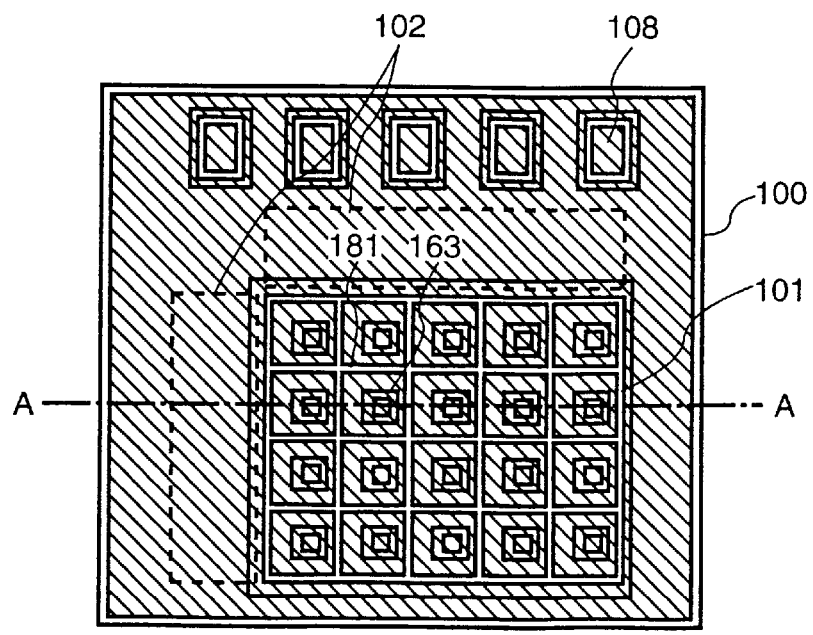
FIG. 1(b) is a plan view of the liquid crystal light valve, according to the first embodiment of the present invention, viewed from a light irradiation direction.

FIGS. 1(a) and 1(b) show a construction of a liquid crystal light valve according to one embodiment of the present invention. FIG. 1(a) is a sectional view taken along line A—A of a plan view FIG. 1(b). FIG. 1(b) is the plan view of a semiconductor substrate viewed from a light irradiation direction.

The liquid crystal light valve of the embodiment is constructed by a semiconductor substrate 100 on which a pixel circuit and a drive circuit are formed; a facing substrate 300 in which a facing electrode 302 made of a transparent conductive material, such as ITO (Indium-tin-oxide), is formed on a transparent glass substrate 301; and a sealing medium 510 for causing the substrate 100 to adhere to the substrate 300 with a liquid crystal 200 disposed therebetween.

On the surface of the single crystal silicon substrate 110 of the semiconductor substrate 100, a first metal layer 140, a second metal layer 160, and a third metal layer 180 are formed through insulating layer; and a pixel circuit section 101, in which a plurality of switching elements 101a constructed by enhancement type NMOS transistors, are disposed, and a drive circuit area 102, constructed by circuit elements 102a, such as enhancement type NMOS and PMOS and the like, and a wire bonding area 108, are disposed. The sampling circuit 2, horizontal scanning circuit 3, vertical scanning circuit 4, and AND circuit 5 are formed in the drive circuit section 102.

In the pixel circuit section 101, a pixel electrode 181 formed on the third metal layer 180 and a shading region 163 formed on the second metal layer 160 are disposed so as to overlap each other and mask the surface of the silicon substrate 100 against light irradiation. A shading layer 181 formed on the third metal layer 180 is disposed on the surface of the silicon substrate 110 of the drive circuit section 102 and the other peripheral section. The shading layers 163 and 181 are formed as patterns on the metal layers, and they reflect or absorb incident light, thereby shading light reaching the semiconductor elements to form the circuits and the semiconductor substrate in the peripheral area.

Figure 2:
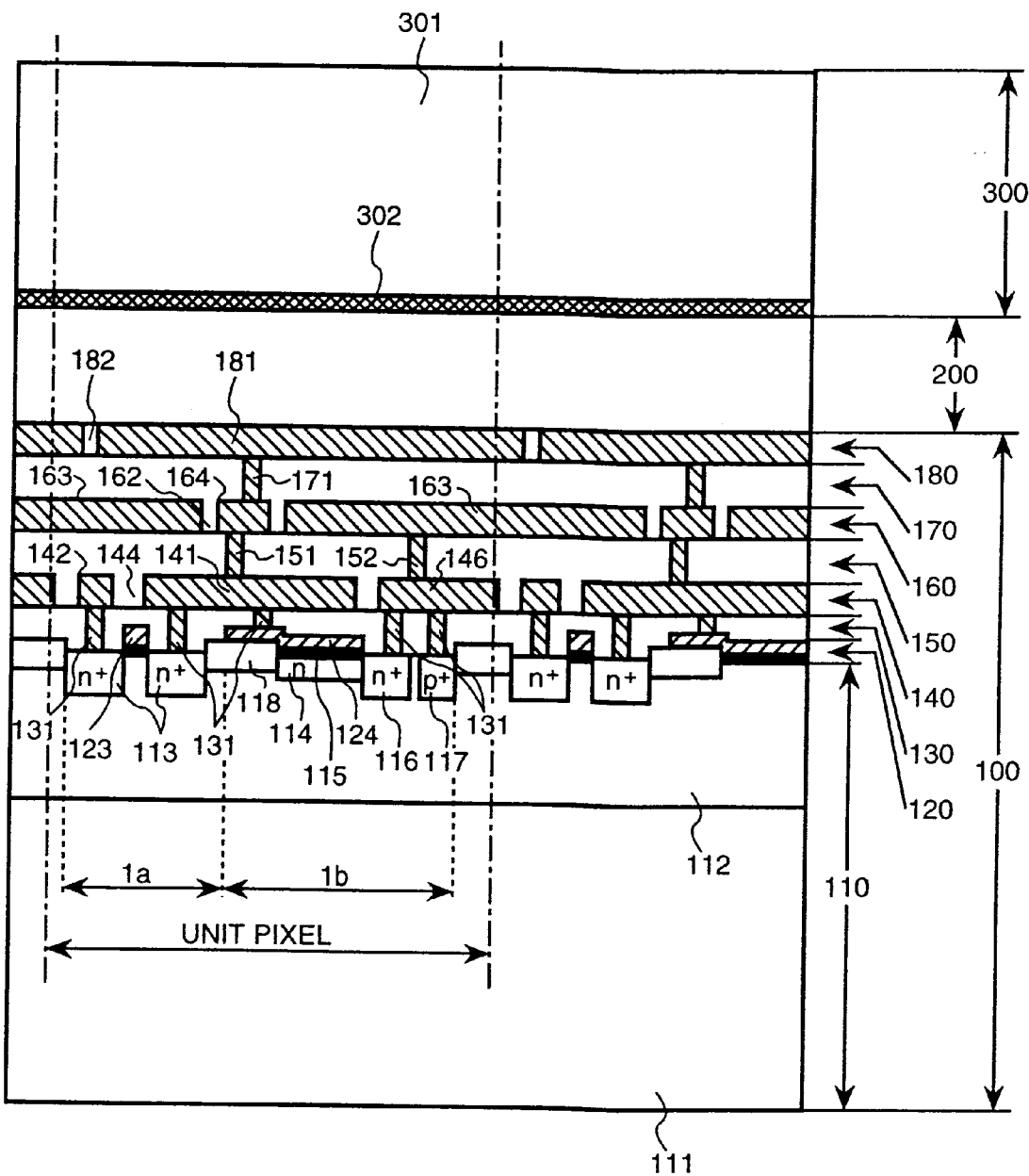
FIG. 2 is a sectional view of a pixel circuit area of the liquid crystal light valve according to the first embodiment.

The construction of the liquid crystal light valve in this embodiment will now be described in detail. FIG. 2 is a sectional view showing a part of the pixel circuit section 101 of the liquid crystal light valve. One pixel circuit 1 is constructed by forming a MOS transistor 1a as an enhancement type NMOS transistor, the MOS capacitor 1b, reflectors, and the like on the surface of the single crystal silicon substrate 110.

The semiconductor substrate 100 comprises: an n-type silicon substrate 111 in which a source region, a drain region, and one electrode region of the holding capacitor 1b constructing the MOS transistor 1a are formed on one surface of the substrate 100; a polysilicon layer 120 selectively formed on the substrate 111; a first insulating layer 130 formed on the polysilicon layer 120; a first metal layer 140 which is formed on the first insulating layer 130 and which penetrates the insulating layer 130 to contact the surface of the n-type silicon substrate 111 and the polysilicon layer 120; a second insulating layer 150 formed on the first metal layer 140; a second metal layer 160 which is formed on the second insulating layer 150 and which penetrates the insulating layer 150 to contact the first metal layer 140; a third insulating layer 170 formed on the second metal layer 160; and a third metal layer 180 which is formed on the third insulating layer 170 and which penetrates the insulating layer 170 to contact the second metal layer 160. Each of the first metal layer 140, second metal layer 160, and third metal layer 180 is made of, for example, aluminum.

The pixel circuit area 101 is made up of the n-type substrate layer 111; a p-type well layer 112; n+ areas 113, 116 formed on the surface of the p-type well layer 112; an n area 114; a p+ area 117; and an element separation area 118. In a unit pixel circuit founded by an alternate long and short dash line, the pair of n+ areas 113 are the source area and the drain area of the MOS transistor 1a, respectively. The n area 114 is one electrode of the holding capacitor 1b. The n+ area 116 and the n area 114, and the p+ area 117 and the p-type well layer 112, are electrically connected, respectively.

The polysilicon layer 120 is selectively formed on the surface of the n-type silicon substrate 111 through an oxide silicon layer 115. Specifically, a gate electrode 123 of the MOS transistor 1a is formed in the p-type well layer 112 between the pair of n+ areas 113 and the other electrode 124 of the holding capacitor 1b is formed on the n area 114. The holding capacitor 1b is formed by the n area 114, the polysilicon layer 124, and the oxide silicon layer 115 which is interposed between them.

The first metal layer 140 is divided by slits 144 into a plurality of parts: a wiring 141 connecting the MOS transistor 1a and the holding capacitor 1b; a wire 142 of the drain of the MOS transistor 1a; and a wiring 146 for supplying power to one of the electrodes of the MOS capacitor 1b and the p-type well layer 112.

The wiring 141 is in contact with one of the pair of n+ areas 113 and the polysilicon layer 124 by way of contact holes 131 provided in the insulating layer 130. The drain wiring 142 is in contact with the other one of the pair of n+ areas 113 by way of the contact hole 131 provided in the insulating layer 130. The power supply wiring 146 is in contact with the n+ area 116 connected to one of the electrodes of the MOS capacitor by way of the contact hole 131 provided in the first insulating layer 130 and with the p+ area 117 connected to the p-type well layer 112.

The second insulating layer 160, in which the shading layer 163 and a middle electrode 164 are formed, is disposed in the upper part of the first metal layer 140 through the second insulating layer 150. The third metal layer (wiring layer) 180, in which the pixel electrodes (reflectors) 181 are formed, is connected to the upper part of the metal layer 160 through the third insulating layer 170. The shading layer 163 and the middle electrode 164 are partitioned by a slit 162. The pixel electrodes 181 are partitioned by slits 182. The shading layer 163 is connected to the wiring 146 via a through hole 152, thereby supplying a voltage of the p-type well and one of the MOS capacitor. The wiring 141 is connected to the middle electrode 164 via a through hole 151 and further to the pixel electrode 181 via a through hole 171 and outputs a source voltage of the MOS transistor 1a to the pixel electrode 181.

The liquid crystal light valve constructed as mentioned above is of a reflection type in which a strong light irradiated from the glass substrate 300 side is reflected by the pixel electrode 181 and the intensity of the reflected light is controlled by the state of the liquid crystal 200. For example, when a polymer dispersion type liquid crystal is used as the liquid crystal 200, the liquid crystal 200 is changed from a scattered state to a transparent state by an output voltage of the pixel electrode 181. The reflectance of each pixel is high when the liquid crystal 200 is in the transparent state and the reflectance is low when the liquid crystal is in the scattered state. By controlling the change in state of the liquid crystal by the voltage of the pixel electrode 181, as mentioned above, the image is displayed.

Shading of the irradiation light will now be described. A light entering from the slit 182 between the reflecting pixels 181 formed in the third metal layer 180, which is the uppermost section, is shaded by the shading layer 163 formed in the second metal layer 160. That is, when it is seen from the facing substrate 300 side, since the slit 182 formed in the third metal layer 180 and the slit 162 formed in the second metal layer 160 are not overlapped, but are disposed so as to be offset from each other, the light entering from the facing substrate 300 side is reflected by either one of the third and second metal layers, so that it doesn't reach the semiconductor substrate 110.

With the above construction, the direct light which enters from the facing substrate 300 side can be almost completely shaded. In addition to the direct light along the normal line, a light obliquely entering the slit 182 between the electrodes or a part of the light scattered in an uneven place of the shading layer 163 are reflected by the third insulating layer 170, thereby becoming stray light. The stray light may pass through the slit 164 in the second metal layer and the slit 144 in the first layer and reach the semiconductor substrate 110. The uneven portions of the shading layer 163 are determined by plane patterns of the MOS transistor 1a, the MOS capacitor 1b, the first metal layer 140, and the like.

In the embodiment, the slit 182 between the pixels in the third metal layer 180 is disposed in correspondence to the even portion of the shading layer 163 in the second metal layer 160. Further, at least one of the faces of the first metal layer 140 and the second metal layer 160 and the undersurface of the third metal layer 180 has a multi-phase of, for example, a material of a low reflectance, such as wolfram silicon (WSi), molybdenum silicon (MoSi) or the like and aluminum. With such a construction, the stray lights reaching the semiconductor substrate 110 can be remarkably reduced.

Figure 3:
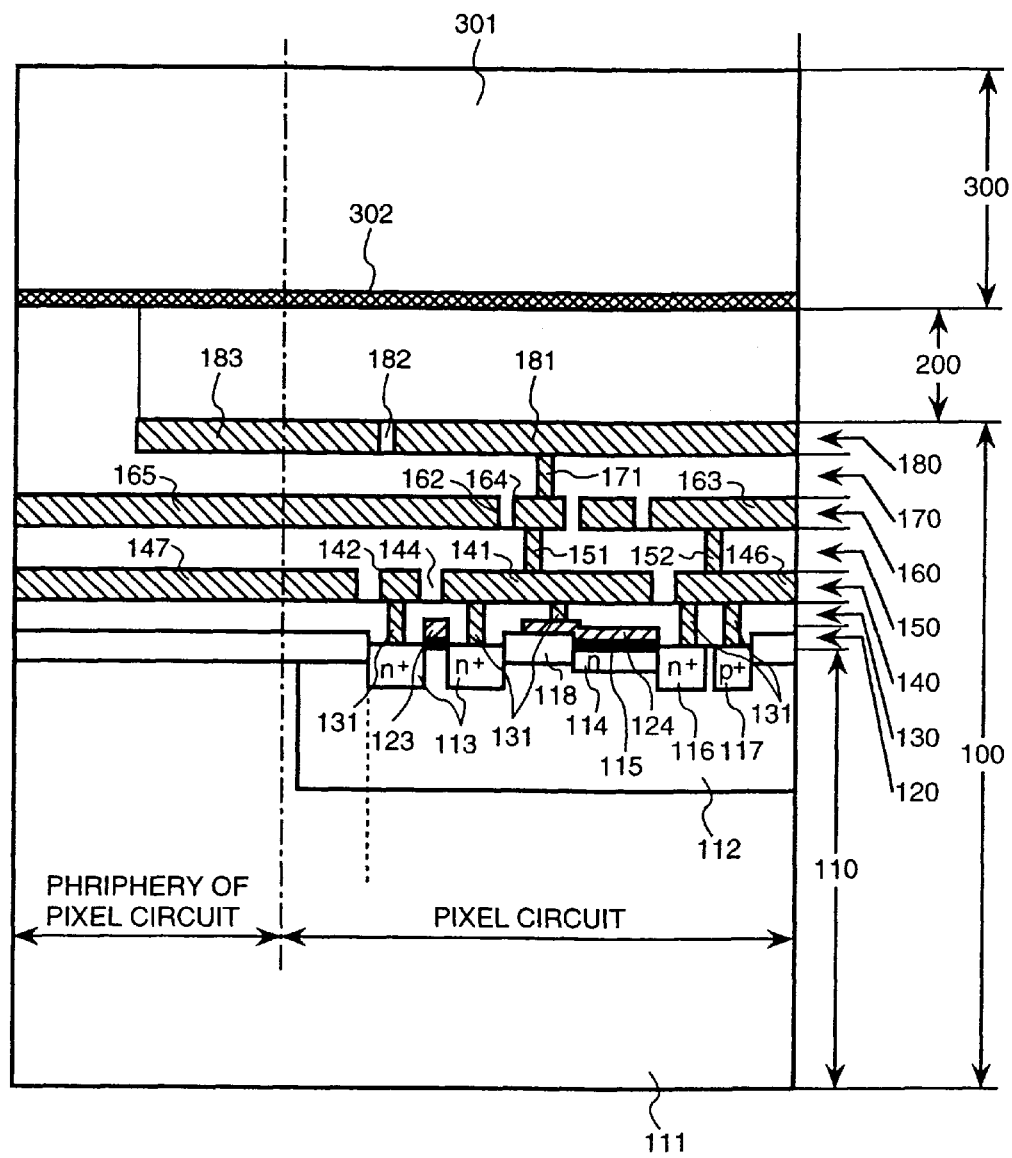
FIG. 3 is a sectional view of the pixel circuit and its peripheral area in the liquid crystal light valve according to the first embodiment.

FIG. 3 is a sectional view of the pixel circuit and its periphery in the liquid crystal light valve of the embodiment. The pixel circuit area 101 is provided in the well region 112 formed in the n-type silicon substrate 111. In the periphery of the pixel circuit area 101, a shading layer 165 formed in the second metal layer 160 is provided, and an electrode 183 which is electrically separated from the electrode 181 is formed in the uppermost third metal layer 180 to supply a voltage that is equal to that of an electrode 302 which faces the electrode 183, thereby setting an application voltage of the liquid crystal of the pixel circuit to the periphery to zero.

Figure 4:
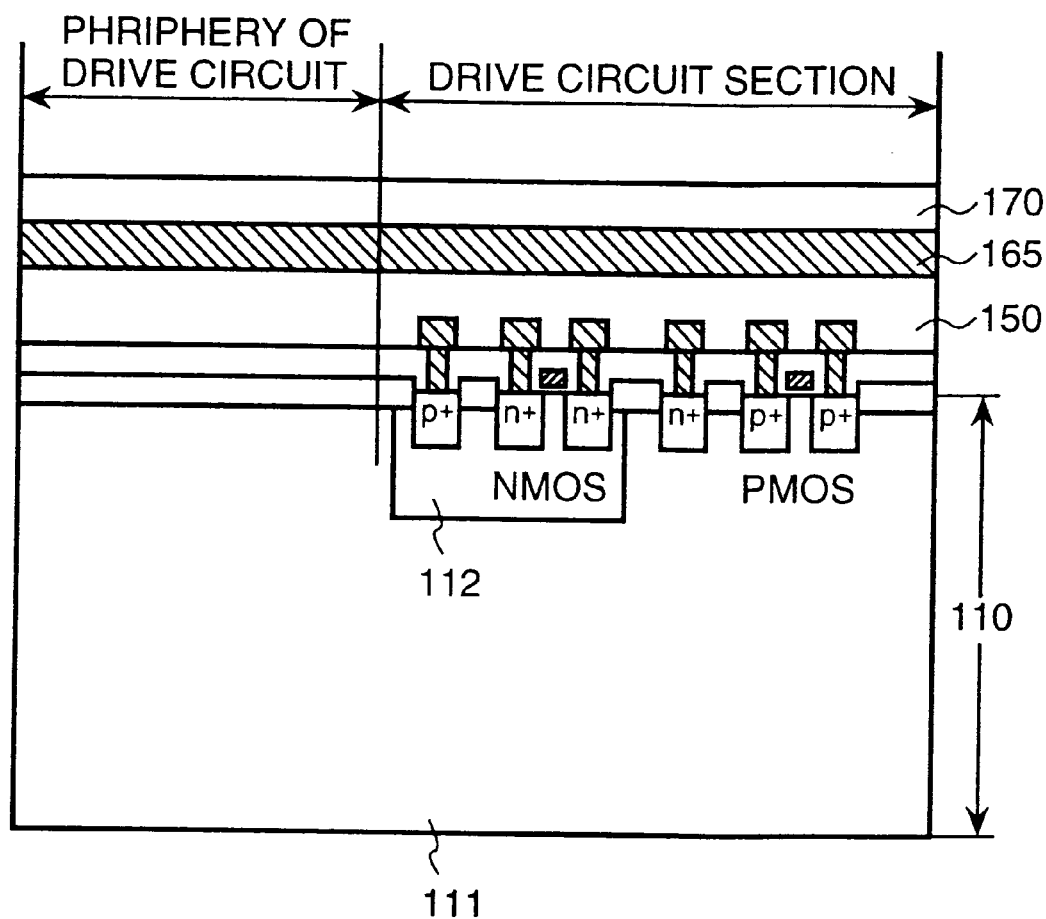
FIG. 4 is a sectional view of a drive circuit area and its peripheral area in a semiconductor substrate according to the first embodiment.

FIG. 4 is a sectional view of a drive circuit and its periphery in the embodiment. A PMOS transistor is formed on the surface of the n-type silicon substrate 111. An NMOS transistor is formed in the p-type well region 112. The drive circuits, such as horizontal scanning circuit 3, the vertical scanning circuit 4, and the like, are constructed by using the transistors. A shading layer 165 for shading the incident light from the facing substrate 300 side in the second metal layer 160 is provided in the upper part of the drive circuit and the periphery. A shading layer can be provided by the metal layer 140 or 180.

In the liquid crystal light valve of the embodiment as mentioned above, the light irradiated on the pixel circuit area is interrupted by the shading layer 163. The light irradiated on the periphery of the pixel circuit area is interrupted by the shading layer 165. The light irradiated onto the drive circuit area and its periphery is interrupted by the shading layer 166. Consequently, even if a strong light is irradiated as in the case of the projection type display, the incident light on the silicon substrate is certainly interrupted, so that the latch-up phenomenon can be prevented and deterioration or breakage of characteristics of the elements can be avoided. Further, since the electrode is provided in the upper part of the periphery of the pixel circuit, the application voltage of the liquid crystal to the periphery of the pixel circuit area becomes zero and the portion is darkened, thereby improving the picture quality at the periphery of the picture screen.

Figure 5:
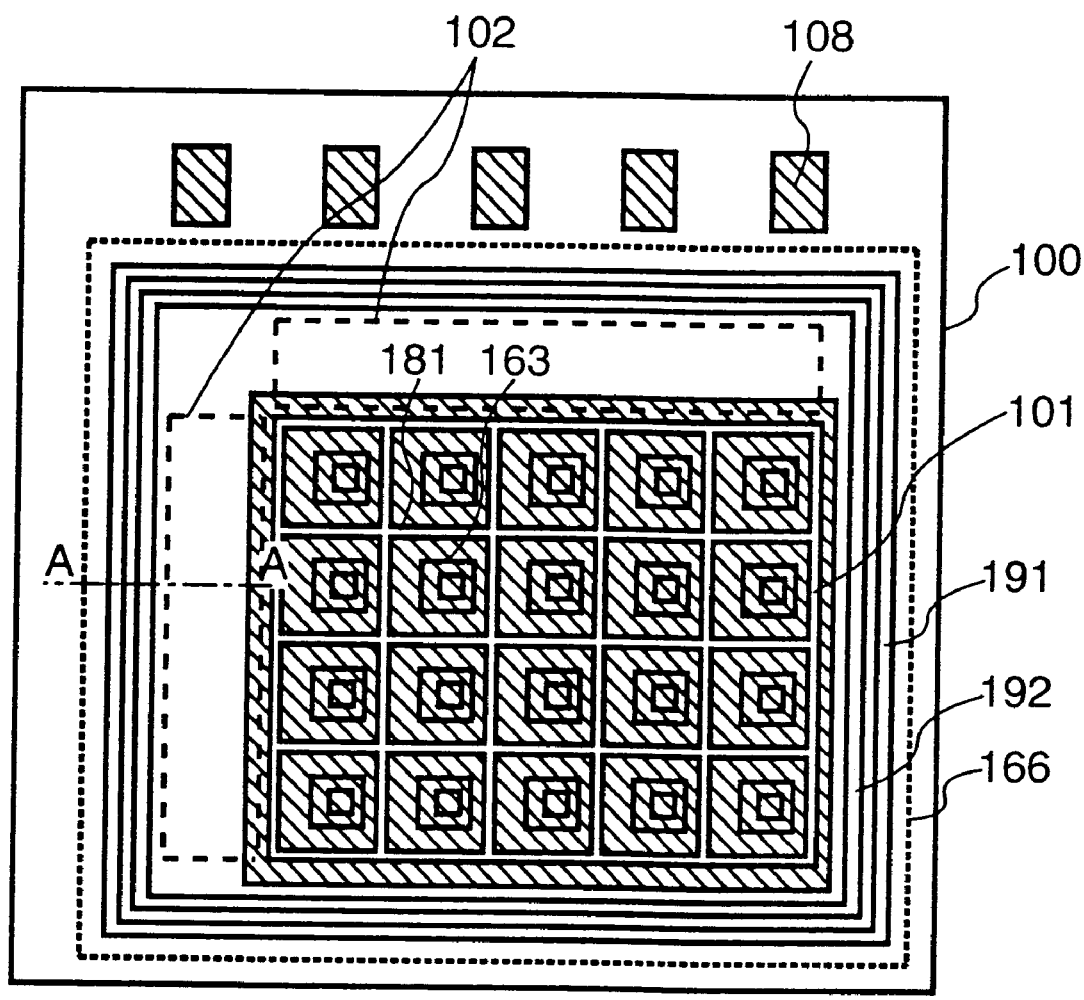
FIG. 5 is a plan view of a drive circuit area and its peripheral area in a semiconductor substrate of a liquid crystal light valve according to a second embodiment of the present invention.
Figure 6:
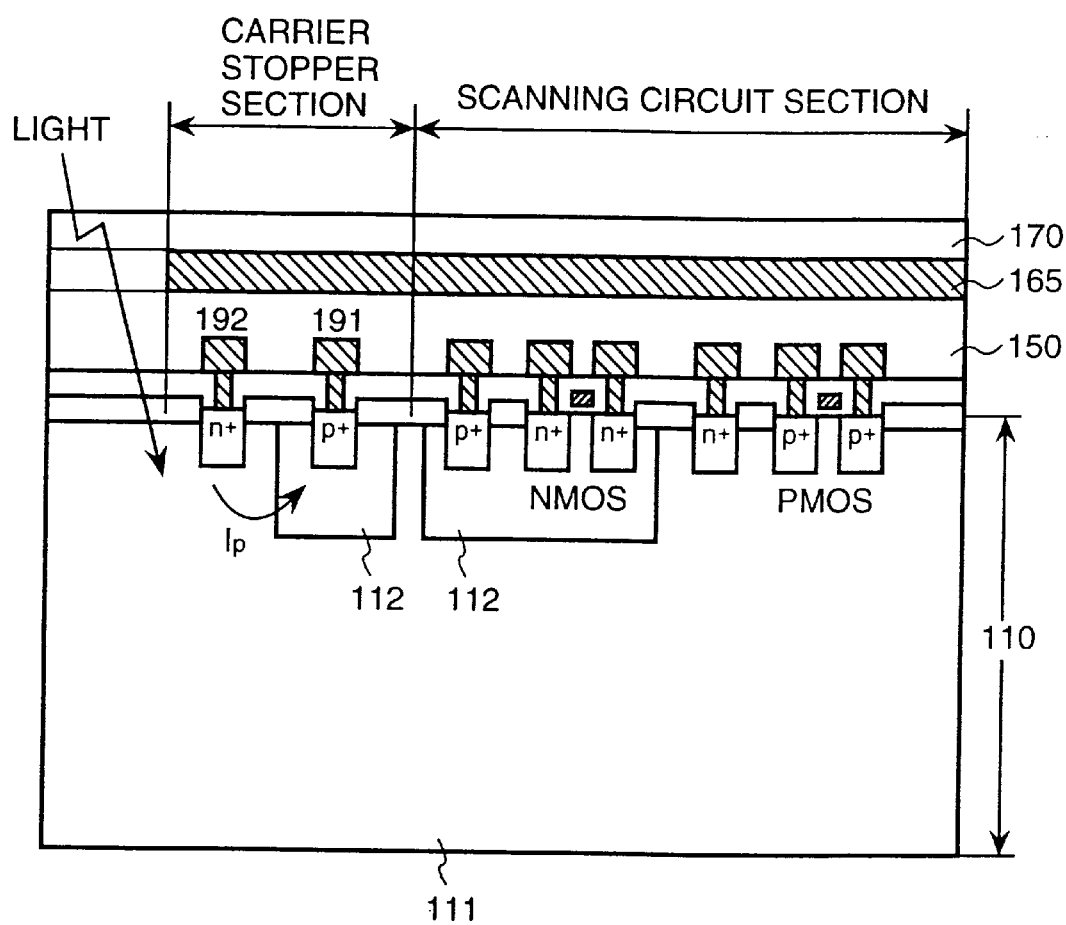
FIG. 6 is a sectional view along line A—A in FIG. 5, showing the drive circuit area and its peripheral area in the semiconductor substrate according to the second embodiment.

A liquid crystal light valve according to a second embodiment of the invention will now be described. FIG. 5 is a plan view of the liquid crystal light valve. FIG. 6 is a section view taken along line A—A. The difference between this embodiment and the foregoing embodiment is that a carrier stopper layer is provided.

The carrier stopper layer is provided so as to surround the pixel circuit area 101 and the drive circuit area 102. Specifically, the carrier stopper layer comprises an n+ area 192 on the surface of the n-type silicon substrate 110 and a p+ area 191 in the p-type well layer 112. The maximum voltage (VDD) is supplied to the n+ area 192 and the minimum voltage (VSS) is supplied to the p+ area 191.

With such a construction, carriers generated by the light irradiated around the semiconductor substrate 100 are attracted by the carrier stopper area, so that a photoelectric current Ip flows from the n+ area 192 to the p+ area 191. Thus, the photoelectric current does not flow into the elements in the drive circuit, thereby preventing latch-up.

Figure 7:
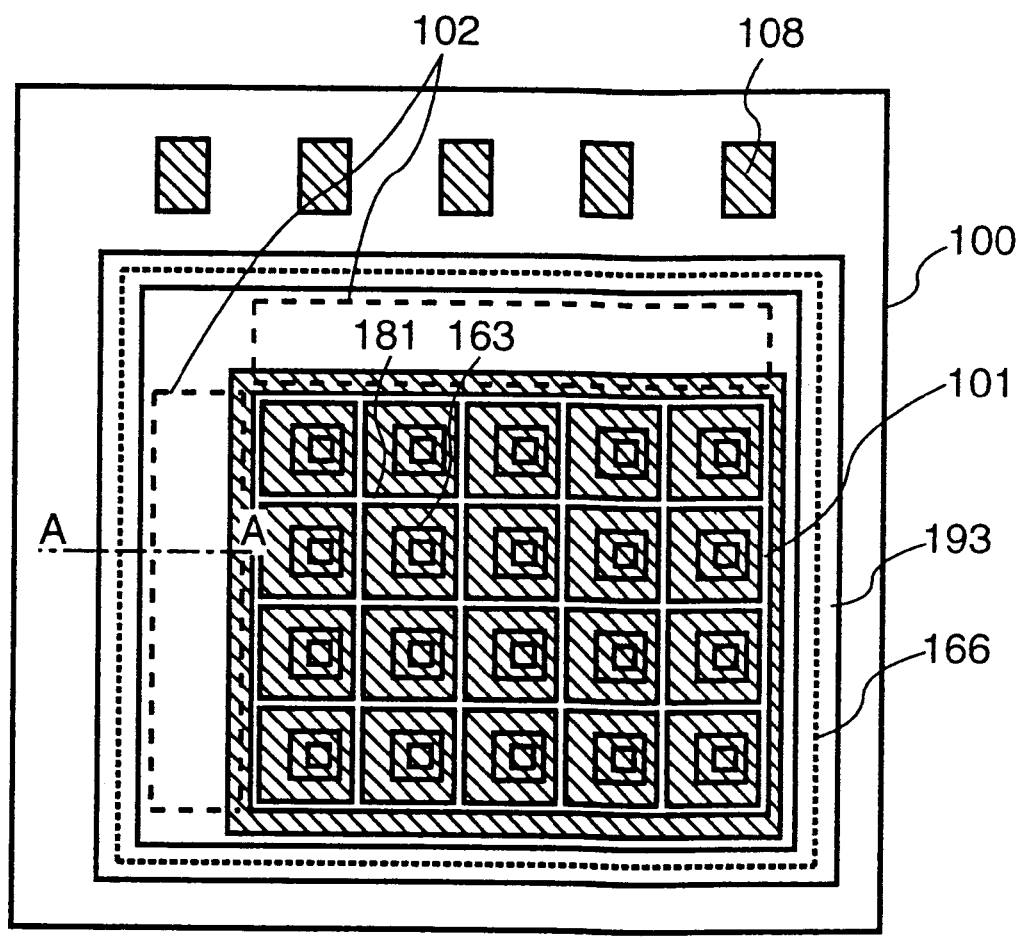
FIG. 7 is a plan view showing the drive circuit area and its peripheral area in the semiconductor substrate according to a modified example of the second embodiment.
Figure 8:
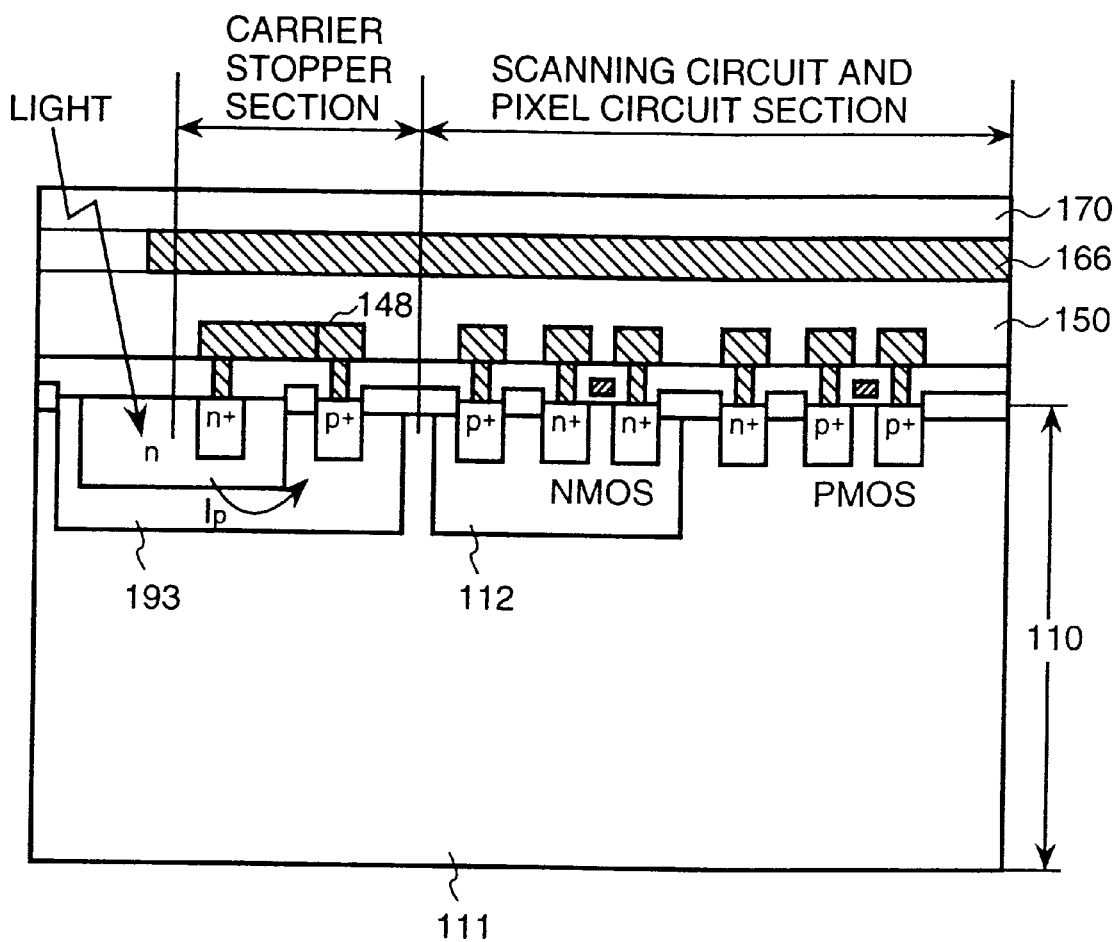
FIG. 8 is a sectional view along line A—A in FIG. 7, showing the drive circuit area and its peripheral area in the semiconductor substrate according to the modified example of the second embodiment.

A liquid crystal light valve representing a modification of the second embodiment will be described with reference to a plan view of FIG. 7 and a section view of FIG. 8. In this example, the carrier stopper layer is realized in the p-type well layer. Specifically, a p+ area and an n area are provided in the p-well layer 193 on the surface of the n-type silicon substrate 110. Further, an n+ area is provided in the n area, and the p+ area and the n+ area are connected by a wiring 148.

With such a construction, carriers generated by the light irradiated on the periphery of the semiconductor substrate 100 are converted to the photoelectric current Ip in the carrier stopper area in the p-type well layer 193. Consequently, since a photoelectric current does not flow in the elements in the drive circuit, latch-up can be prevented.

Figure 16:
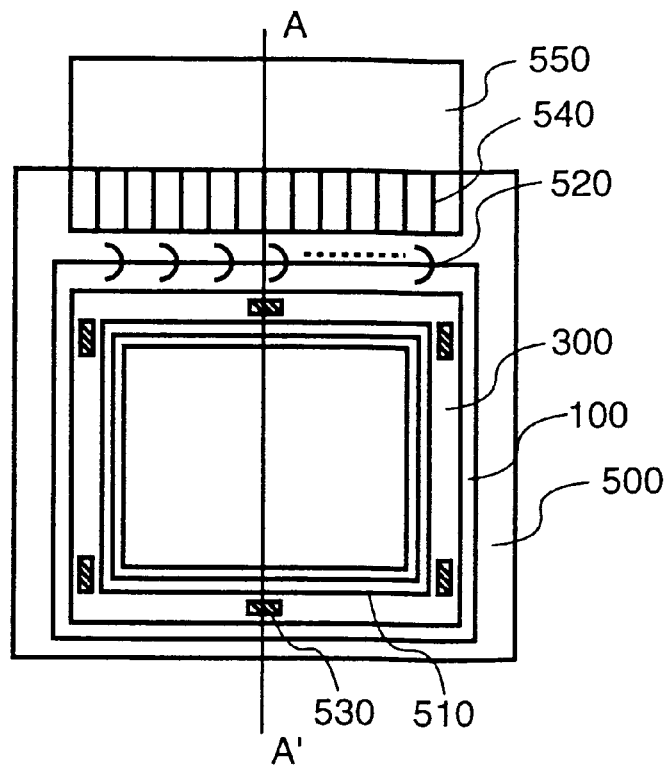
FIG. 16 is a plan view showing a construction in which a liquid crystal light valve of the present invention is incorporated.
Figure 17:
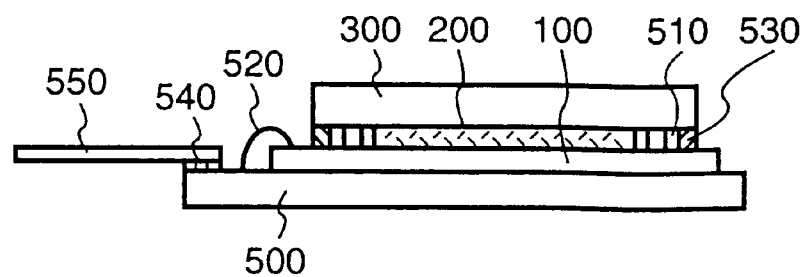
FIG. 17 is a side sectional view showing a construction in which the liquid crystal light valve of the present invention is incorporated.

An installation of the liquid crystal light valve described in the embodiments will now be explained by using a plan view of FIG. 16 and a section view of FIG. 17.

The semiconductor substrate 100 on which the pixel circuit 1, horizontal scanning circuit 3, vertical scanning circuit 4, and the like are formed is bonded to a ceramic substrate 500 by a conductive paste with the circuit section upside. The liquid crystal 200 is filled in between the semiconductor substrate 100 and the substrate 300 which faces the substrate 100. The liquid crystal 200 is sealed by a seal medium 510 around the periphery and is protected from moisture of the outside and the like. The facing electrode 302 on the surface of the facing substrate 300 is connected with the wiring patterns, such as an electrode 181 formed in the uppermost metal layer 180 in the semiconductor substrate 100, by using the conductive paste 530.

A signal terminal 550 of the facing substrate 300 is connected to a wiring pattern formed on the ceramic substrate by a wire bonding 520. The wire bonding position on the semiconductor substrate 100 and the connection position of the facing electrode 302 on the surface of the facing substrate 300 are set to only one upper side, thereby making the area of the signal terminal section of the semiconductor substrate 100 small.

Figure 18:
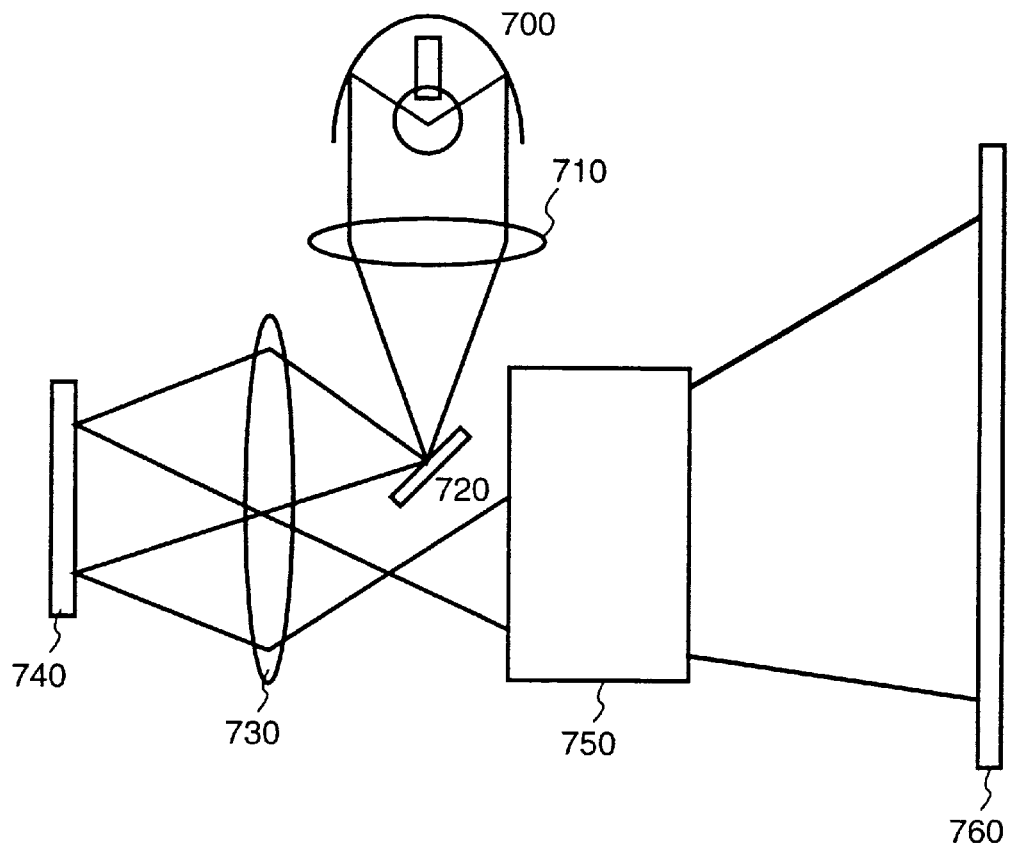
FIG. 18 is a schematic diagram for explaining a construction of a projection type display to which the liquid crystal light valve of the present invention is applied.

FIG. 18 is a schematic diagram showing the construction of a projection type display employing the above-mentioned liquid crystal light valve. The projection type display is constructed by a light source 700, a first lens 710, a mirror 720, a second lens 730, a liquid crystal light valve 740, a projection lens 750, and a screen 760.

Light from the light source 700 is converged on a position on the mirror 720 by a lens 710 and is formed into parallel beams by the first lens 730. The parallel beams are irradiated onto the liquid crystal light valve 740. The liquid crystal light valve 740 controls a reflection state of the irradiated light by a voltage applied to the liquid crystal pixels and forms an image by enlarging and projecting the reflected light from the liquid crystal light valve 740 onto the screen 760 through the lens 730 and the projection lens 750.

The light flux from the light source is separated into the three primary colors of light. Liquid crystal light valves are provided for the respective light flux. The reflected light from the three liquid crystal light valves are again synthesized, enlarged, and projected, thereby obtaining a projection type color display. The separation of the light into the three primary colors and the synthesis of the reflected lights from the three liquid crystal light valves can be simultaneously executed by, for example, using dichroic mirrors.

In the projection type display, the light irradiated on the liquid crystal light valve is equal to millions of lux, so that the elements are deteriorated or destroyed by the latch-up phenomenon and the picture quality consequently deteriorates. According to the present invention, however, since the liquid crystal light valve is provided with shading means for interrupting the light irradiation to the silicon substrate on which the pixel circuit area, the drive circuit area, and the peripheries are formed and also for preventing the stray light resulting from the oblique incident light or scattering in the metal wiring layer, latch-up is certainly prevented and the light resistance can be improved up to approximately five million lux. Consequently, a projection type display using the liquid crystal light valve can be put into practical use.

A liquid crystal light valve using the single crystal silicon substrate and a projection type display using such a light valve have been described above. It should be understood that the liquid crystal light valve of the present invention can be realized by using an insulating substrate on which a semiconductor layer is formed, a compound semiconductor substrate, and the like in place of the silicon substrate.

Figure 19:
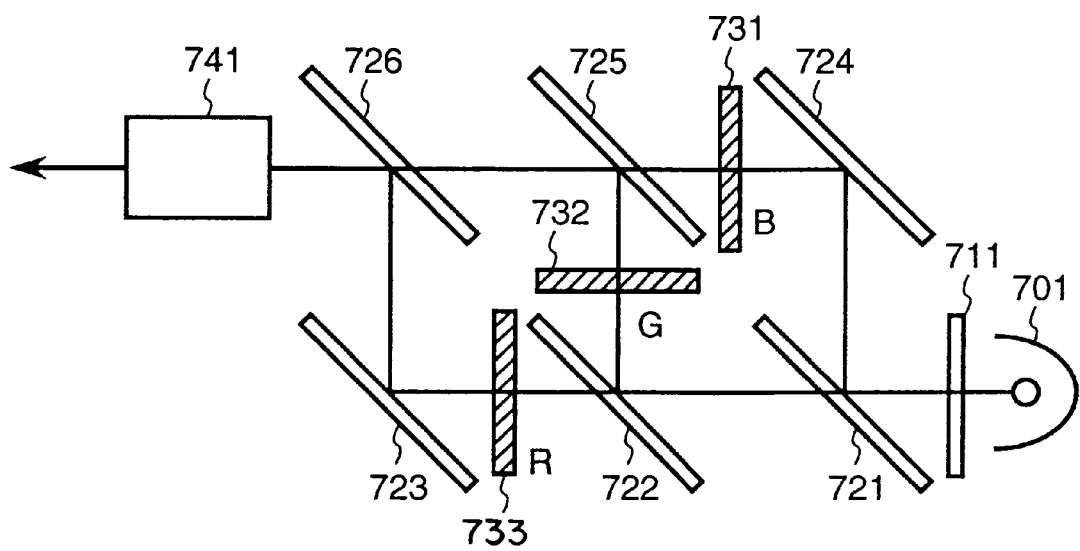
FIG. 19 is an explanatory diagram for showing an example of a color projection type image display apparatus in which the liquid crystal panel is used as a light valve.
Figure 20:
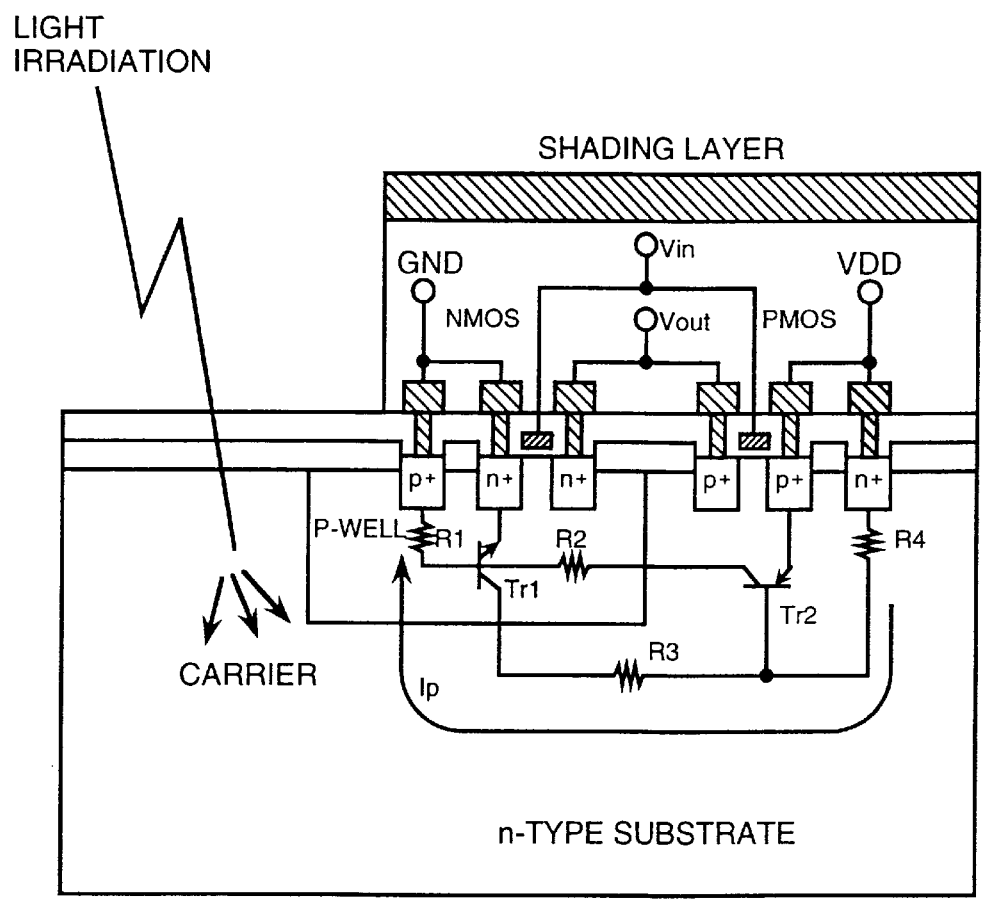
FIG. 20 is a schematic diagram for explaining a latch-up phenomenon of a parasitic bipolar transistor.
Figure 21:
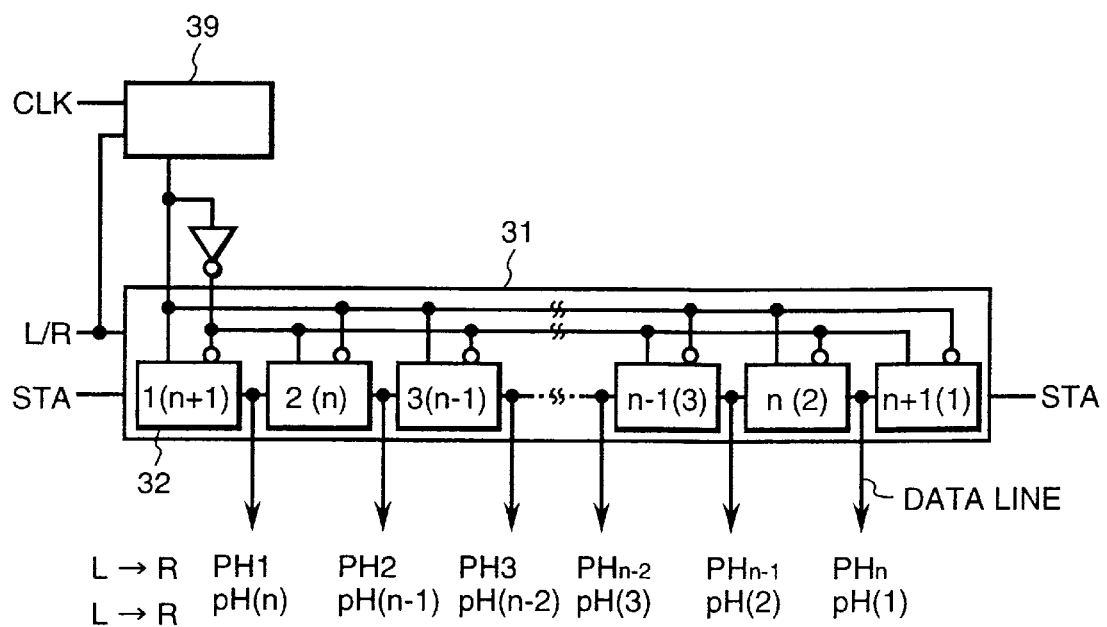
FIG. 21 is a block diagram showing a conventional horizontal scanning circuit.

FIG. 19 shows an example of a color liquid crystal projection type display apparatus using a liquid crystal panel of the transmission type as a light valve. In the diagram, reference numeral 701 denotes a white light source; 711 a filter for eliminating infrared light (JR) and ultraviolet (W) light; 724, 723 are total reflection mirrors; 721 a blue light reflection dichroic mirror; 722, 725 are green light reflection dichroic mirrors; 726 a red light reflection dichroic mirror; 731 a liquid crystal panel serving as a light valve for the blue color; 732 a liquid crystal panel serving as a light valve for the green color; a liquid crystal panel 733 serving as a light valve for the red color; and 741 a projection lens system 741.

The white light source 701 is a light source for generating a visible light consisting of a continuous spectra, for example, a halogen lamp. A white light emitted from the white light source 701 is sequentially subjected to color separation by the blue light reflection dichroic mirror 721 and the green light reflection dichroic mirror 722, thereby obtaining a blue light B, a green light G, and a red light R.

The blue light B is reflected by the total reflection mirror 724 to the liquid crystal panel 731 for the blue color. The green light G enters the liquid crystal panel 732 for the green color. The red color R enters the liquid crystal panel 733 for the red color.

The blue, green and red colors which have entered the liquid crystal panels 731, 732, and 733 are subjected to image modulation. After that, the three colors are synthesized onto the same optical axis by the green light reflection dichroic mirror 725, the total reflection mirror 723, and the red light reflection dichroic mirror 726 and the synthesized light enters the projection lens system 741. The colors are projected onto a predetermined screen of a transmission type or reflection type, thereby displaying an enlarged color image.

Although an example using a transmission type liquid crystal panel as a light valve has been described above, a reflection type liquid crystal panel can be also used as a light valve.

In such a color liquid crystal projection type display apparatus, as obviously understood from FIG. 19, three liquid crystal panels corresponding to the colors of R, G, and B are used. The lights subjected to color separation by the dichroic mirrors and the like are modulated by the liquid crystal panels operating as light valves, and the modulated colors are synthesized again by the dichroic mirrors and the like, thereby forming a color image. In case of FIG. 19, an image of the G color among the three colors of R, G, and B is a mirror image for the other R and B images. In order to obtain a normal synthetic image, it is consequently necessary to invert the mirror image of G.

A display area of an image by the liquid crystal display section 1 in the foregoing embodiment will now be described.

As mentioned above, the number of columns of the liquid crystal display section 1 is larger than the number of pixels n in the column direction of the video signal to be displayed by one. The number of lines is larger than the number of pixels m in the line direction by one.

The last column or line in the scanning direction consequently is not displayed since there is no video data. The first column next to the (n)th column in the scanning direction is displayed in the horizontal scanning direction. The first line next to the (m)th line in the scanning direction is displayed in the vertical scanning direction. When the direction of scanning is changed, the last column in which nothing is displayed is changed between right and left and the last line is changed between up and down.

For example, when the three liquid crystal panels of R, G, and B are used for color display as shown in FIG. 19, the display areas are different in the liquid crystal panel in which the scanning direction is inverted and the liquid crystal panel in which the scanning direction is not inverted. It is necessary to register images in consideration of such a fact.

According to the liquid crystal light valve of the present invention, since there is provided shading means for interrupting the light irradiation to the pixel circuit area, the drive circuit area, and the peripheries, the photoelectric current of the semiconductor substrate is reduced, thereby preventing latch-up. The deterioration in picture quality due to a deterioration or breakage of the elements can be avoided and there is an effect wherein saturation of the image can be improved.

A plurality of metal layers for forming the circuits are used and shading means is disposed in the lower layer so as to mask the space whereby the light cannot be reflected in the wiring pattern of the reflectors in the upper layer, so that there is an effect that the light can be certainly shaded with a compact device of small scale.

Further, in addition to the shading layer for the circuit areas, carrier stopper area is provided for absorbing carriers which occur due to the light irradiation to the peripheral areas, so that the photoelectric current of the semiconductor substrate is remarkably reduced even when the irradiation light is strong, and there is an effect such that latch-up can be certainly prevented.

According to the projection type display of the present invention, a liquid crystal light valve which can resist light irradiation of about five million lux can be applied, so that there is an effect wherein an enlarged picture screen of high luminance and high precision can be provided.

According to the liquid crystal panel of the present invention, since the peripheral circuits to be built in are simplified, the number of elements in the whole periphery circuit is reduced, thereby realizing the improvement.

Consequently, since the number of wires among the elements is reduced, the length of the wire can be shortened. When the length of the wire is shortened, the parasitic capacitance of the wire itself and a parasitic capacitance due to intersection with other wires can be reduced, so that waveform deterioration and delay of the clock signal due to the wiring can be suppressed, thereby improving the operational speed.

What is claimed is:

1. A liquid crystal light valve comprising:
    a semiconductor substrate having on one surface thereof a display region including a plurality of switching elements disposed in a matrix construction and a drive circuit region for driving said display region;
    a plurality of metal layers laminated via an insulation layer and disposed on at least said one surface of said semiconductor substrate, each metal layer being subdivided by a slit;
    an uppermost metal layer of said plurality of metal layers being a pixel electrode and serving as an output terminal to said plurality of switching elements;
    a metal portion of any one of said plurality of metal layers disposed under said uppermost metal layer being disposed under and facing a portion of the slit of said uppermost metal layer;
    a portion of one of said uppermost metal layer and any one of said plurality of metal layers disposed under said uppermost metal layer being arranged so as to cover said drive circuit region;
    a transparent substrate having a common electrode opposing said pixel electrode; and
    a liquid crystal layer inserted between said semiconductor substrate and said transparent substrate.

2. A liquid crystal light valve according to claim 1, wherein at least one of said plurality of metal layers has a metal silicide layer of one of WSi and MoSi formed on one of an upper and bottom surface thereof.

3. A liquid crystal light valve according to claim 1, further comprising carrier absorption means formed in said drive circuit region of said semiconductor substrate for absorbing carriers generated by light irradiation.

4. A liquid crystal light valve according to claim 3, wherein said carrier absorption means utilizes one of a well region and a diffusion region to which power is supplied.

5. A projection type liquid crystal display comprising:
    a light source;
    a liquid crystal light valve comprising
        (a) a semiconductor substrate having on one surface thereof a display region including a plurality of switching elements disposed in a matrix construction and a drive circuit region for driving said display region,
        (b) a plurality of metal layers laminated via an insulation layer and disposed on said one surface of said semiconductor substrate, each metal layer being subdivided by a slit,
        (c) an uppermost metal layer of said plurality of metal layers being a pixel electrode and serving as an output terminal to said plurality of switching elements,
        (d) a metal portion of any one of said plurality of metal layers disposed under said uppermost metal layer being disposed under and facing a portion of the slit of said uppermost metal layer,
        (e) a portion of one of said uppermost metal layer and any one of said plurality of metal layers disposed under said uppermost metal layer being arranged so as to cover said drive circuit region,
        (f) a transparent substrate having a common electrode opposing said pixel electrode, and
        (g) a liquid crystal layer inserted between said semiconductor substrate and said transparent substrate;
    a screen for displaying a picture thereon; and
    optical means for collimating a light from said light source, for irradiating the collimated light to said liquid crystal light valve, and for projecting a reflected and enlarged light from said liquid crystal light valve on said screen.

6. A projection type liquid crystal display according to claim 5, wherein at least one of said plurality of metal layers in said liquid crystal light valve has a metal silicide layer of one of WSi and MoSi formed on at least one of an upper and bottom surface thereof.

7. A projection type liquid crystal display according to claim 5, wherein said liquid crystal light valve comprises carrier absorption means formed in said drive circuit region of said semiconductor substrate for absorbing carriers generated by light irradiation.

8. A projection type liquid crystal display according to claim 7, wherein said carrier absorption means in the liquid crystal light valve utilizes one of a well region and a diffusion region to which power is supplied.

* * * * *

UNITED STATES PATENT AND TRADEMARK OFFICE
CERTIFICATE OF CORRECTION

PATENT NO. : 6,081,305
DATED : June 27, 2000
INVENTOR(S) : Hideo Sato, et al.

It is certified that error appears in the above-identified patent and that said Letters Patent is hereby corrected as shown below:

Title page,
Item 73 Assignee, replace "Hitachi, Ltd,Tokyo, Japan"
with -- Hitachi, Ltd. & Hitachi Device Engineering Co., Ltd., Tokyo & Mobara-shi, Japan -- .

Signed and Sealed this

Twenty-eighth Day of August, 2001

Attest:

*Nicholas P. Godici*

NICHOLAS P. GODICI
*Attesting Officer*    *Acting Director of the United States Patent and Trademark Office*